US007560675B2

(12) United States Patent
Takahashi

(10) Patent No.: US 7,560,675 B2
(45) Date of Patent: Jul. 14, 2009

(54) MICROSCOPE SYSTEM HAVING A CONTROLLING UNIT FOR SWITCHING BETWEEN A PLURALITY OF OBSERVATION STATES

(75) Inventor: Chika Takahashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/001,446

(22) Filed: Dec. 11, 2007

(65) Prior Publication Data
US 2008/0144170 A1    Jun. 19, 2008

(30) Foreign Application Priority Data
Dec. 14, 2006   (JP) ............................... 2006-337279

(51) Int. Cl.
*G02B 21/00*  (2006.01)
(52) U.S. Cl. .................. 250/201.3; 250/306; 359/381; 359/368
(58) Field of Classification Search ........... 250/201.3, 250/306, 307, 310; 359/368, 432, 380–384, 359/385–388, 821
See application file for complete search history.

(56) References Cited

U.S. PATENT DOCUMENTS 5,703,714 A * 12/1997 Kojima ...................... 359/368

6,881,954 B1 * 4/2005 Morimoto et al. ........... 250/306
2003/0090789 A1   5/2003 Herz et al.
2003/0161036 A1   8/2003 Gonschor

FOREIGN PATENT DOCUMENTS

| JP | 7-104188 A | 4/1995 |
|---|---|---|
| JP | 8-68946 A | 3/1996 |
| JP | 2002-014288 A | 1/2002 |
| JP | 2002-277745 A | 9/2002 |

OTHER PUBLICATIONS

Japanese Office Action dated Jan. 20, 2009 (2 pages), issued in counterpart Japanese Application No. 2006-337279.

* cited by examiner

*Primary Examiner*—Georgia Y Epps
*Assistant Examiner*—Tony Ko
(74) *Attorney, Agent, or Firm*—Frishauf, Holtz, Goodman & Chick, P.C.

(57) ABSTRACT

Various types of optical members can be electrically inserted/extracted to/from an optical path. The state of the insertion/extraction or the state of opening/closing is detected by a sensor. An operating unit obtains various types of instructions. A controlling unit comprises a memory. The memory records a plurality of states of the insertion/extraction of an optical member in/from an optical path or the state of opening/closing, which is detected by the sensor, as an observation state. A controlling circuit switches an observation state to any of observation states recorded in the memory by controlling the insertion/extraction or the opening/closing each time the operating unit obtains an instruction to request the setting of an observation state.

10 Claims, 17 Drawing Sheets

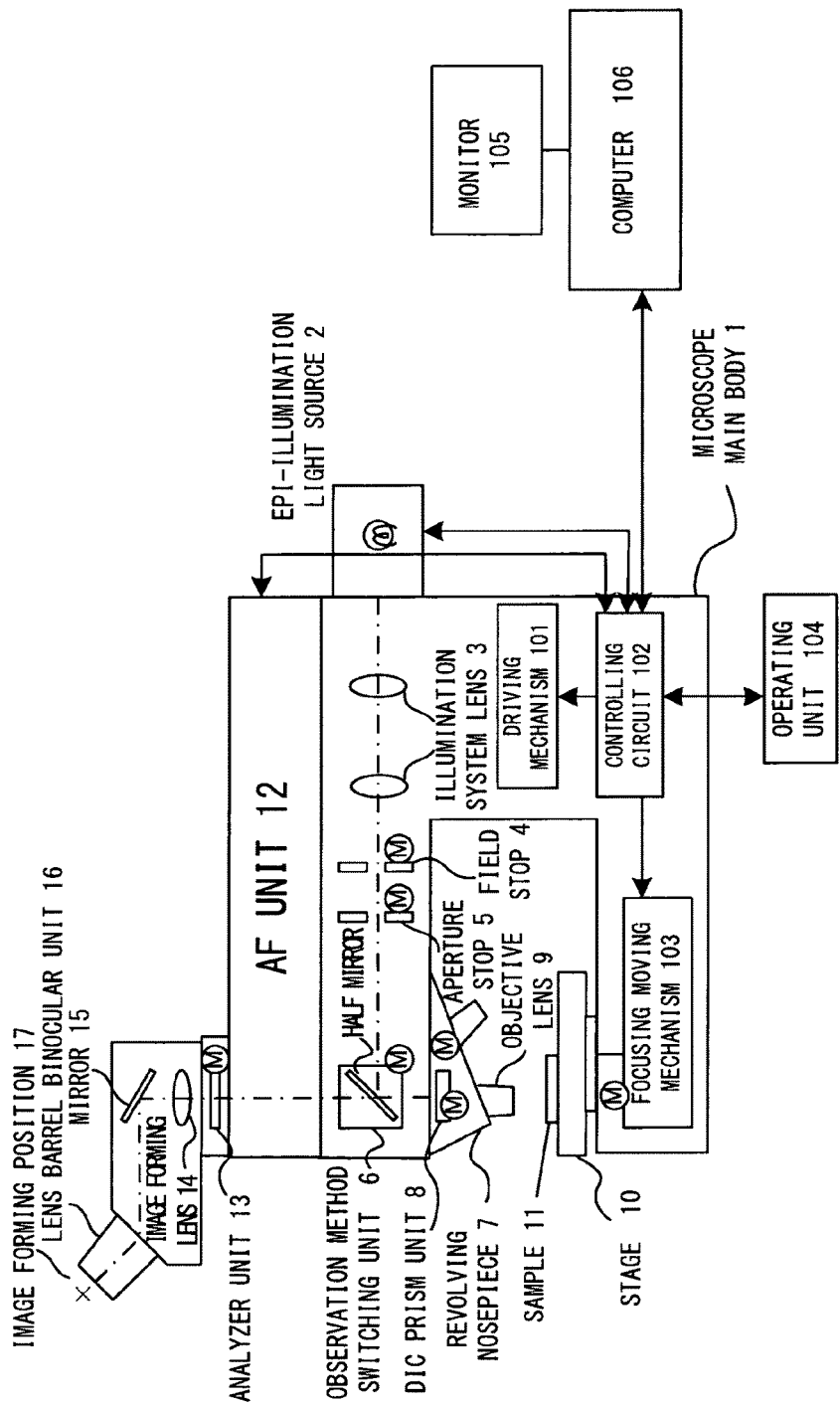
F I G. 1

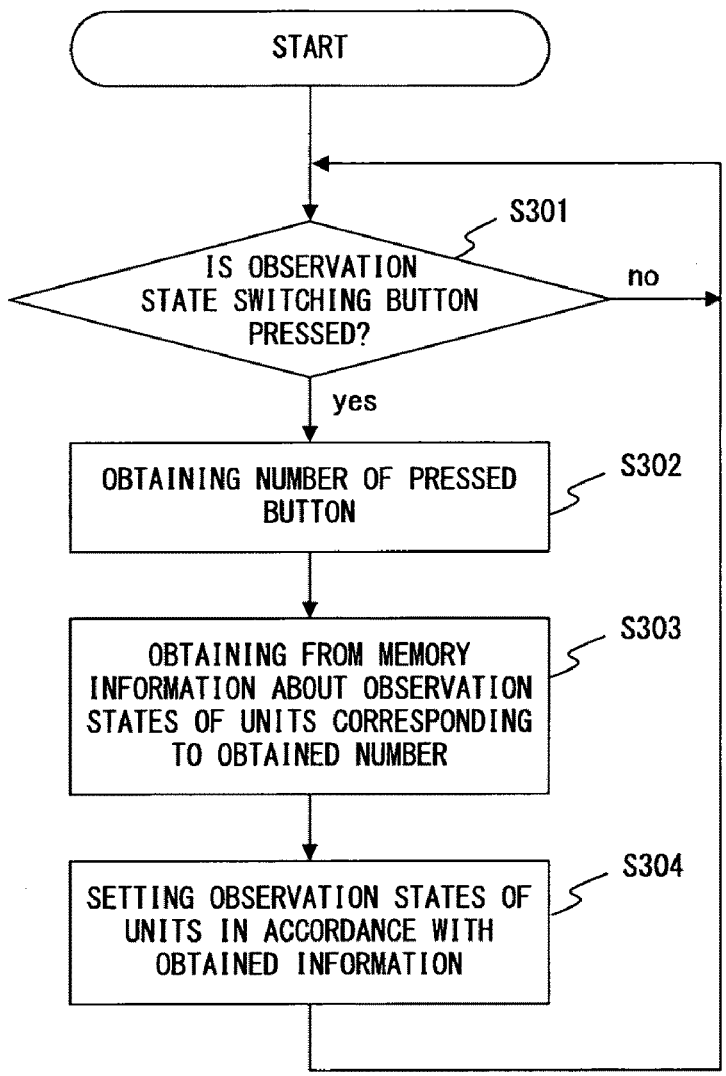
F I G. 7

| COMBI-NATION | NUMBER | OBJECTIVE LENS | AS | LAMP | CUBE |
|---|---|---|---|---|---|
| 1 | 1 | ×5 BD | 7 | 5 | BF |
| | 2 | ×10 BD | 6 | 6 | BF |
| | 3 | ×50 BD | 3 | 7 | BF |
| | 4 | ×50 BD | 10 | 10 | DF |
| | 5 | ×100 BD | 3 | 7 | BF |
| | 6 | ×100 BD | 3 | 7 | DIC |
| 2 | 1 | ... | ... | ... | ... |
| | 2 | ... | ... | ... | ... |
| | 3 | ... | ... | ... | ... |
| | 4 | ... | ... | ... | ... |
| | 5 | ... | ... | ... | ... |
| | 6 | ... | ... | ... | ... |

F I G. 8

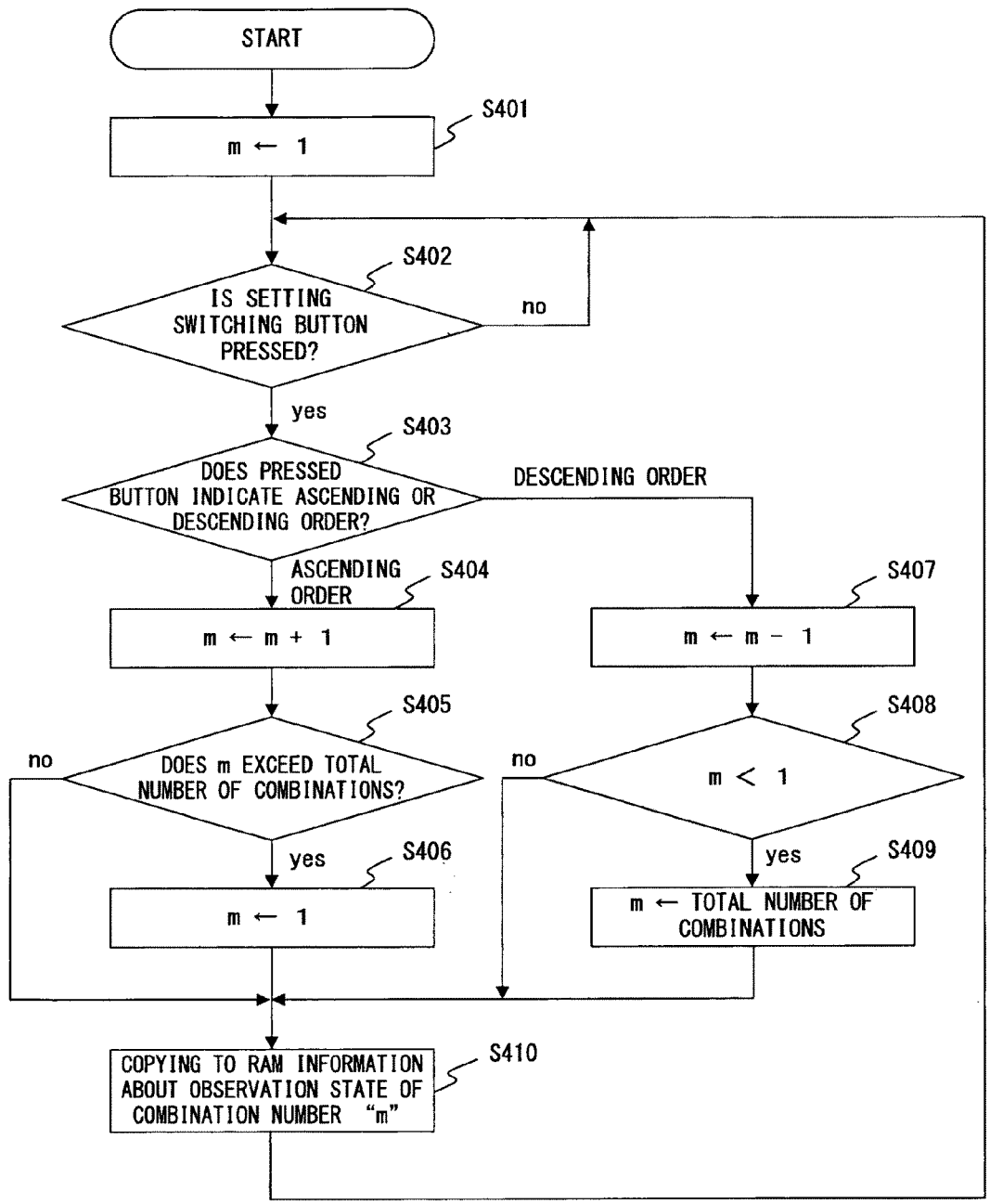
F I G. 9

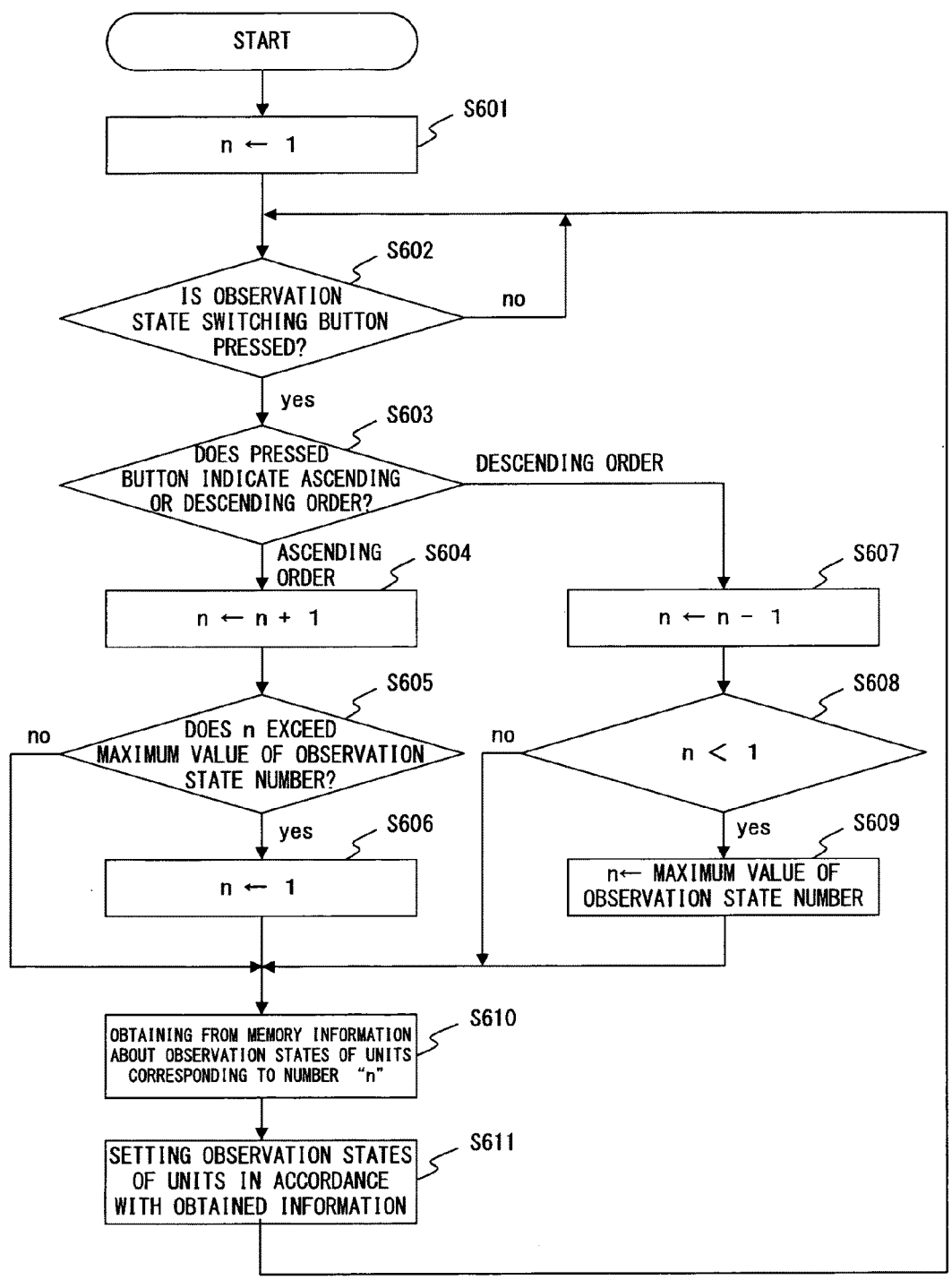
F I G. 1 5

MICROSCOPE SYSTEM HAVING A CONTROLLING UNIT FOR SWITCHING BETWEEN A PLURALITY OF OBSERVATION STATES

CROSS REFERENCE TO RELATED APPLICATIONS

This application claims benefit of Japanese Application No. 2006-337279, filed Dec. 14, 2006, the contents of which are incorporated by this reference.

BACKGROUND OF THE INVENTION

1. Field of the Invention

The present invention relates to a technique of a microscope, and more particularly, to a technique for improving the operability of a microscope.

2. Description of the Related Art

Microscopes, and optical examining apparatuses using a microscope are used for various purposes such as observation of cells, a body tissue, etc. in a medical/biological field, examinations of a semiconductor wafer, an FPD (Flat Panel Display) glass substrate, a magnetic head, and the like in industrial fields, research and development of a metal structure or a new material, or the like, and there are diverse apparatuses responding to user needs.

When a sample is observed with such a microscope, various types of units (such as various types of illuminations, an aperture stop, a field stop, a revolving nosepiece, an automatic focusing mechanism, a mechanism for switching an optical element such as a lens, a filter, etc.), which are included in a microscope, must be operated according to an observation condition.

When a desired microscopy is implemented, satisfactory observation using a microscope cannot be made unless various types of optical members are suitably combined. Diversified microscopies are sometimes used according to an observation target and its characteristic to be detected. Therefore, superior operability for suitably combining various types of optical elements is desired for a microscope.

Additionally, in the industrial use of a microscope or in a pathological examination, also a routine examination, which observes a target having a particular shape or characteristic by changing a microscopy according to predetermined procedures and repeats observation for a group of targets, is made. In such a case, the operability of switching of observation states including the above described switching of microscopies exerts a significant influence on operating efficiency.

Concerning the technique for improving the operability of a microscope, for example, Japanese Published Unexamined Patent Application No. H8-68946 discloses the technique for enabling the easy reproduction of an observation state that a user desires to set by saving the insertion/extraction states of optical members, and a shooting condition on a storage medium such as an IC card, and by enabling the states and the condition to be restored later, even when an infrequently used microscope is utilized, or when one microscope is shared by a plurality of persons.

In the meantime, if a microscope is used for the above described routine examination that repeats observation while changing microscopies, etc. by switching various types of units of the microscope according to predetermined procedures, the operability of switching of an observation state must be improved to increase operating efficiency.

The technique disclosed by the aforementioned Japanese Published Unexamined Patent Application No. H8-68946 is suitable for making observation by reproducing one state such as settings at the time of the observation. However, a user must perform procedures for once shifting the operating mode of a microscope system to a mode dedicated to switching, and for making a selection from among observation states recorded on an IC card based on a date, a comment, etc. when switching an observation state. Namely, this technique does not always offer high operability when an observation state is switched, and is problematic especially when a routine examination is made.

SUMMARY OF THE INVENTION

A microscope system in one aspect of the present invention comprises an electrically-operated unit for electrically controlling an optical member, a detecting unit for detecting the control information of the optical member on an optical path, an instruction obtaining unit for obtaining various types of instructions, a recording unit for recording a plurality of observation states detected by the detecting unit when the instruction obtaining unit obtains an instruction to request the recording of an observation state, and a controlling unit for controlling the electrically-operated unit each time the instruction obtaining unit obtains the instruction to request the setting of an observation state, and for switching the observation state to any of the observation states recorded in the recording unit.

BRIEF DESCRIPTION OF THE DRAWINGS

The present invention will be more apparent from the following detailed description when the accompanying drawings are referenced.

FIG. 1 shows a configuration of a microscope system for implementing the present invention;

FIG. 7 shows the contents of a first example of an observation state switching process as a flowchart;

FIG. 8 shows part of a memory map of a nonvolatile memory comprised by a controlling circuit;

FIG. 9 shows the contents of a setting switching process as a flowchart;

FIG. 15 shows the contents of a third example of the observation state switching process as a flowchart;

DESCRIPTION OF THE PREFERRED EMBODIMENTS

Figure 2:
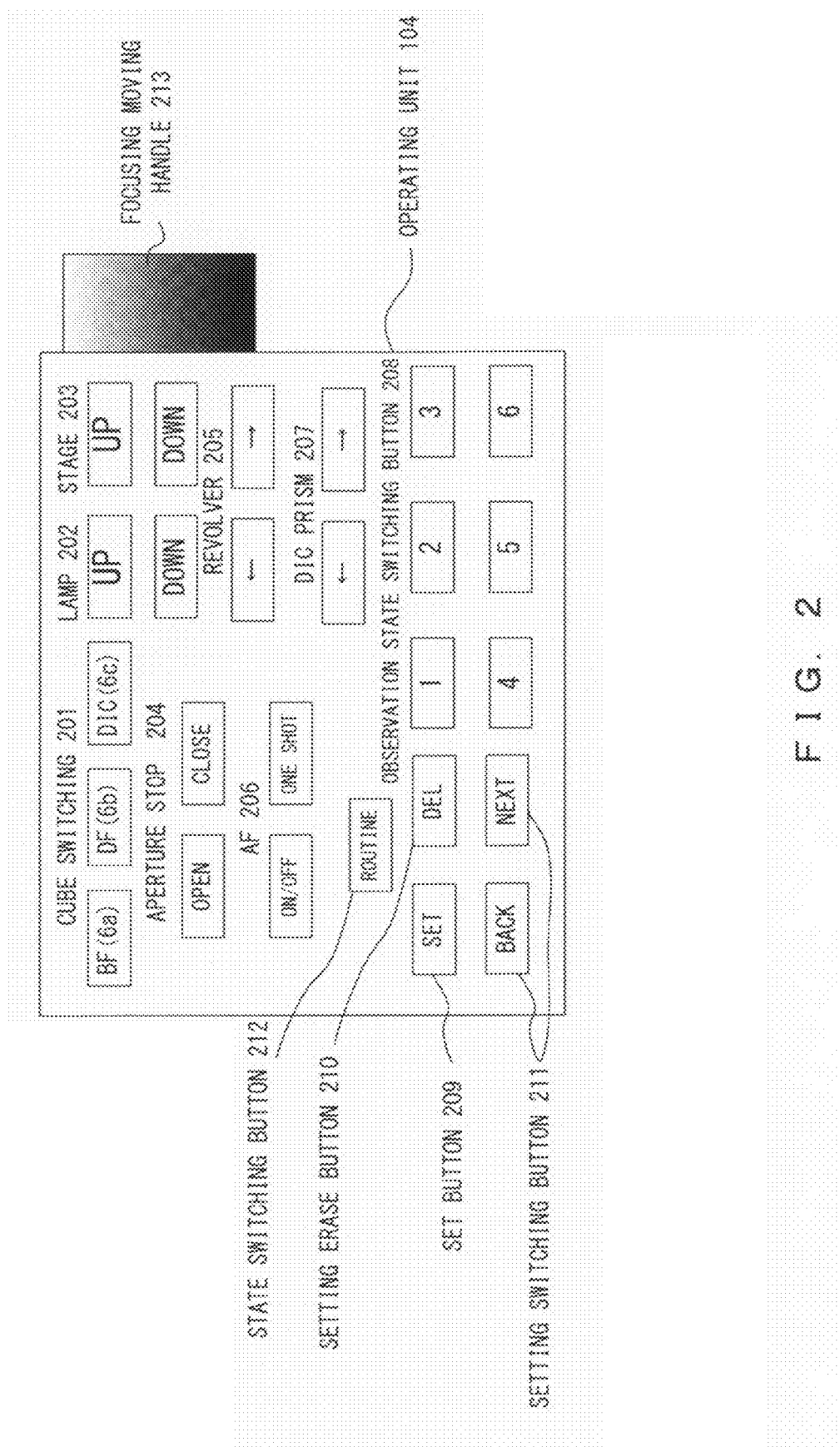
FIG. 2 shows a first configuration example of an operating unit.

A preferred embodiment according to the present invention is described below with reference to the drawings.

FIG. 1 is described first. This figure shows a configuration of a microscope system for implementing the present invention.

An optical system comprised by a microscope main body 1 in the microscope system shown in FIG. 1 is described first.

Illumination light emitted from an epi-illumination light source 2 composed of a halogen lamp, etc. is incident to a unit (here a unit comprising a half mirror) selected on an observation method switching unit 6 via illumination system lenses 3, a field stop 4, and an aperture stop 5. Thereafter, this illumination light irradiates a sample 11 placed on a stage 10 via a DIC (Differential Interference Contrast) prism unit 8, which is inserted in a revolving nosepiece 7, and a selectable objective lens 9 on the revolving nosepiece 7.

Reflection light from the sample 11 passes through the half mirror of the observation method switching unit 6 via the objective lens 9 and the DIC prism unit 8. Then, this reflection light is reflected by a mirror 15 and incident to a lens barrel binocular unit 16, and its image is formed in an image forming position 17 after the light passes through an AF unit 12, an analyzer unit 13, and an image forming lens 14.

Electrically-operated units comprised by the microscope main body 1 are described next.

The field stop 4 is intended to make an adjustment so that illumination light illuminates only an observation field. This is a unit the aperture diameter of which is configured to be adjustable by controlling its opening/closing with a driven motor. Additionally, the aperture stop 5 is intended to adjust a contrast, brightness, and the depth of focus. This is also an electrically-operated unit the opening/closing of which is controlled by driving a motor, and the aperture diameter of which is configured to be adjustable to a suitable size for each aperture ratio of an objective lens 9.

To the observation method switching unit 6, three cube units 6a to 6c, which are not shown, more specifically, a brightfield observation cube 6a (BF), a darkfield observation cube 6b (DF), and a differential interference observation cube 6c (DIC) are attached in this preferred embodiment. The observation method switching unit 6 is an electrically-operated unit that can switch a cube unit arranged on an optical path by driving a motor according to an observation method.

To the revolving nosepiece 7, a plurality of objective lenses 9 of different types are attached. The revolving nosepiece 7 is an electrically-operated unit that can switch an objective lens 9 arranged on the optical path by being rotated with the driving of a motor according to a magnification factor, an observation method, etc.

The DIC prism unit 8 and the analyzer unit 13 are units required for differential interference observation. With differential interference observation, an extremely small level difference, which is difficult to be detected with normal observation, can be detected as a color difference, although its details are omitted. Additionally, if the DIC prism unit 8 is finely adjusted, this color hue changes. In this preferred embodiment, the DIC prism unit 8 is an electrically-operated unit that is configured to be inserted in the revolving nosepiece 7. By driving a motor, this unit can be inserted/extracted, and the position of the prism after being inserted can be finely adjusted. The analyzer unit 13 is an electrically-operated unit that can be inserted/extracted to/from the optical path by driving a motor.

A driving mechanism 101 drives each motor, so that each of the above described electrically-operated units is operated. The driving mechanism 101 drives each motor in accordance with a control signal transmitted from a controlling circuit 102. Upon receipt of an instruction from an operator, which is issued with an operation performed for the operating unit 104, or upon receipt of an instruction from an operator, which is issued by using a GUI (Graphical User Interface) screen on the monitor 105, which is displayed with a predetermined control program executed by the computer 106, the controlling circuit 102 performs an operation for transmitting a control signal corresponding to this instruction to the driving mechanism 101.

The stage 10 is an electrically-operated unit that is moved with a motor driven by a focusing moving mechanism 103. Upon receipt of an instruction from an operator in the above described way, the controlling circuit 102 transmits a control signal corresponding to this instruction to the focusing moving mechanism 103 similar to the above described operations for the electrically-operated units. The focusing moving mechanism 103 moves the stage 10 by driving the motor in accordance with this control signal. Upon receipt of a signal from the AF unit 12, which indicates the focusing state of the sample 11 relative to the focal position of the objective lens 9, the controlling circuit 102 transmits a control signal according to this signal to the focusing moving mechanism 103. The focusing moving mechanism 103 moves the stage 10 by driving the motor in accordance with this control signal, so that the sample 11 is moved to the focal position of the objective lens 9, and the focus of the sample 11 is achieved. Namely, the AF unit 12, the controlling circuit 102, and the focusing moving mechanism 103 provide an automatic focusing operation as an automatic focal position achieving mechanism.

These electrically-operated units respectively comprise a sensor as detecting means. With this means, the controlling circuit 102 can grasp the state of the insertion/extraction of each member in/from the optical path, and the state of opening/closing of each member, etc. in each of the units. Additionally, a combination of the logics of sensors, a position from a sensor, a change from an initial state, and the like are saved in a RAM (Random Access Memory) within the controlling circuit 102, whereby the controlling circuit 102 can grasp the current states of the units. The controlling circuit 102 also controls the illumination state (brightness) of the epi-illumination light source 2.

The controlling circuit 102 in this preferred embodiment is configured by comprising a processing unit such as an MPU (Micro Processor Unit), etc., a ROM (Read Only Memory) for storing control programs executed by the processing unit so that the controlling circuit 102 implements various types of control processes, the above described RAM that the processing unit uses as a working storage area in order to temporarily hold various types of data depending on need when the processing unit executes the control programs, a nonvolatile memory (such as a flash memory) for storing and holding the settings of the states of the units that configure the microscope system, and an interface unit for managing the transmission/reception of various types of data, which are made between the constituent elements of the microscope system shown in FIG. 1 and the processing unit.

Additionally, a computer having a typical configuration, namely, a computer comprising a processing unit such as an MPU, etc., which governs the control of operations of the entire computer 106 by executing a control program, a main memory that the processing unit uses as a working memory depending on need, a storage device, such as a hard disk device, etc., for storing various types of programs, control data, etc., an interface unit for managing the transmission/reception of various types of data to/from the controlling circuit 102, an inputting unit for obtaining an instruction from an operator, which is issued by being made to correspond to an operation, and an outputting unit for managing displays of various types of screens and information on a monitor 105 is available as the computer 106.

A couple of implementation examples of the present invention in the microscope system shown in FIG. 1 are described below.

IMPLEMENTATION EXAMPLE 1

FIG. 2 is described first. This figure shows a first configuration example of the operating unit 104 in the microscope system shown in FIG. 1.

In this implementation example, upon detection of a press operation that an operator performs for any of various types of buttons arranged on the operating unit 104 shown in FIG. 2, the controlling circuit 102 executes a process that is made to correspond to this operation. Alternatively, the operating unit 104 may be configured by using an image displaying unit, and a touch panel arranged by being stacked on the image displaying unit, the controlling unit 102 may detect a touch operation that an operator performs on the touch panel in accordance with a button display made on an image displaying unit, and the controlling circuit 102 may execute a process that is made to correspond to the touch operation. Or, the computer 106 may receive an instruction from an operator, which is issued by using a GUI (Graphical User Interface) screen displayed on the monitor 105 resultant from the execution of a predetermined control program by the computer 106, and the controlling circuit 102 may receive the instruction from the computer 106, instead of obtaining various types of instructions from the operator, which are issued by using the operating unit 104.

In FIG. 2, cube switching buttons 201 are intended to obtain an instruction to switch among the cube units 6a to 6c inserted in the optical path in the observation method switching unit 6. In this implementation example, it is assumed that the controlling circuit 102 outputs a control signal for inserting not only the differential interference observation cube 6c but also the DIC prism unit 8 and the analyzer unit 13 in the optical path if an instruction to switch to DIC (Differential Interference Observation) is obtained by operating "6c" among the cube switching buttons 201. Note that a button may be added to the operating unit 104 in order to be able to instruct the insertion/extraction of the DIC prism unit 8 and the analyzer unit 13 separately from the differential interference observation cube 6c.

Lamp adjustment buttons 202 are intended to obtain an instruction to adjust the brightness of illumination light emitted from the epi-illumination light source 2.

Stage driving buttons 203 are buttons for obtaining an instruction to move the stage 10. Also a focusing moving handle 213 is a handle for obtaining an instruction to move the stage 10. Here, the stage driving button 203 is intended for an instruction to coarsely move the stage 10, whereas the focusing moving handle 213 is intended for an instruction to finely move the stage 10.

Aperture stop adjustment buttons 204 are intended to obtain an instruction to increase/decrease the aperture amount of the aperture stop 5.

Revolver switching buttons 205 are intended to obtain an instruction to switch among the objective lenses 9 one by one by rotating the revolving nosepiece 7 clockwise or counter-clockwise.

AF buttons 206 are intended to obtain an instruction for an automatic focusing operation performed by the above described automatic focal position achieving mechanism. Here, an instruction to switch between an operation for maintaining a state in which a focus is achieved, and normal observation (the functional stop of the automatic focusing operation) is obtained with an operation performed for an ON/OFF button. In the meantime, an instruction of an operation for once moving the position of the stage 10 so that the sample 11 is moved to the focal position, and for shifting to the normal observation thereafter is obtained with an operation performed for a ONE SHOT button.

DIC prism adjustment buttons 207 are intended to obtain an instruction to finely adjust the DIC prism unit 8.

Observation state switching buttons 208 are buttons for obtaining an instruction to switch the observation state of the microscope system to a preset state.

Other buttons (a set button 209, a setting erase button 210, setting switching buttons 211, and a state switching button 212) provided on the operating unit 104 will be described later.

Here, settings of the observation state of the microscope system in this implementation example are described.

Figure 3:
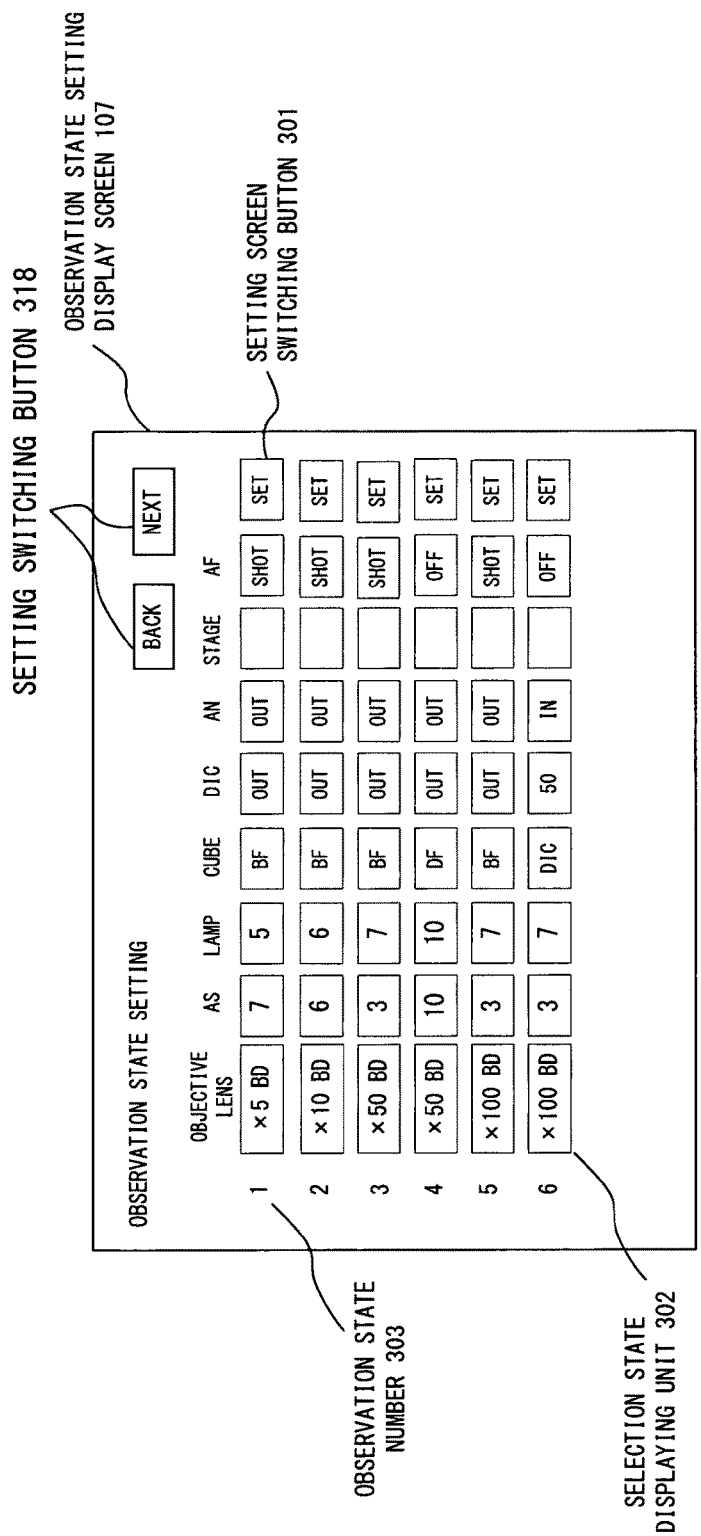
FIG. 3 shows an example of an observation state setting display screen.
Figure 4:
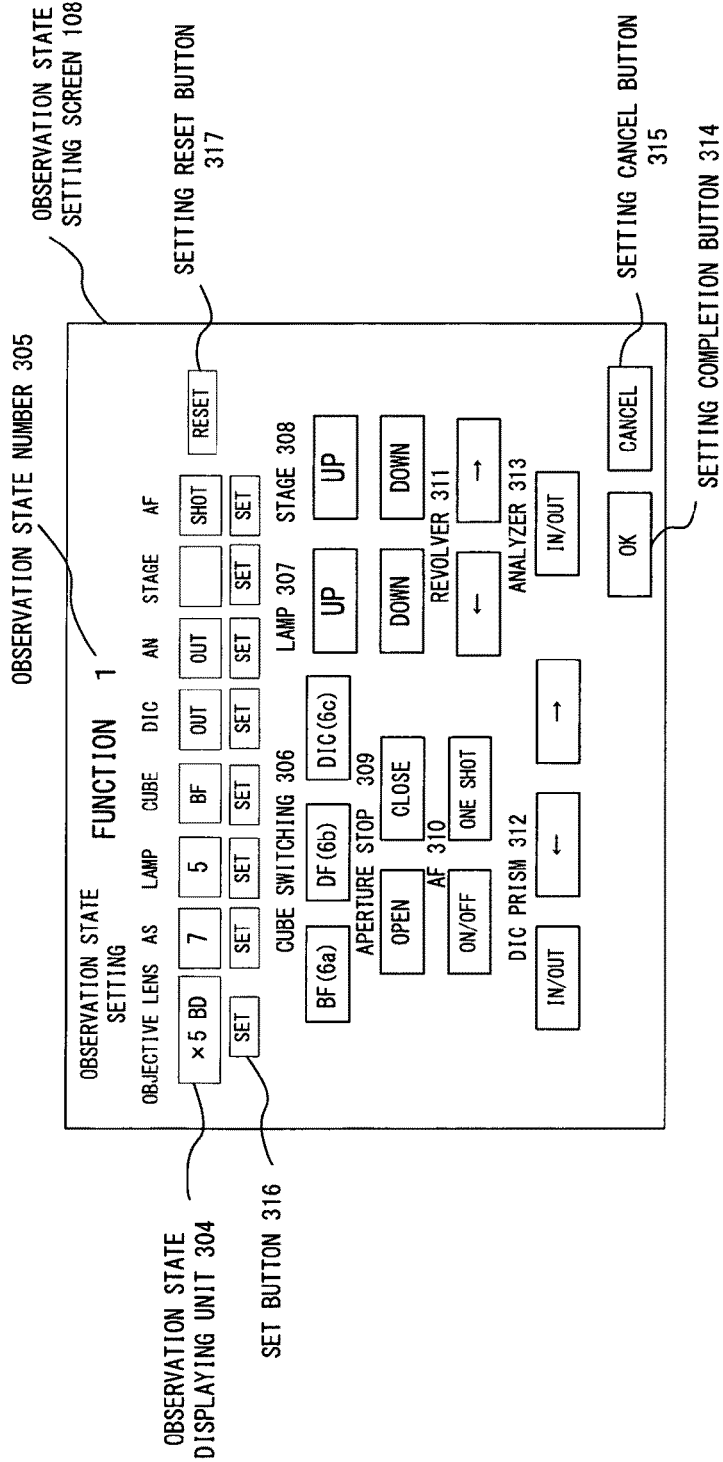
FIG. 4 shows an example of an observation state setting screen.

FIGS. 3 and 4 are described. Both of these figures depict screens displayed on the monitor 105. These screens may be used as GUI screens, and the controlling circuit 102 may receive an instruction from an operator, which is issued by using these screens. Alternatively, the operating unit 104 may be configured with a touch panel, these screens may be displayed on the touch panel, and the controlling circuit 102 may receive an instruction from an operator by detecting a touch operation that the operator performs on the touch panel, instead of displaying these screens on the monitor 105.

An example of an observation state setting display screen 107 shown in FIG. 3 is a screen for displaying a list of already set observation states.

In FIG. 3, observation state numbers 303 are numbers (ranging from "1" to "6" in this implantation example) corresponding to the observation state switching buttons 208 of the operating unit 104. Observation state displaying units 302 respectively indicate the states of the units (the driven states of the electrically-operated units) in each of the observation states. Additionally, a setting screen switching button 301 is a button display used for an instruction to switch a display on the monitor 105 to the observation state setting screen corresponding to each of the above described numbers.

An example of an observation state setting screen 108 shown in FIG. 4 is a screen used to set the observation state corresponding to the number "1" of the observation state numbers 303. In this implementation example, 6 similar observation state setting screens 108 are respectively prepared for the observation state numbers 303.

A selection state displaying unit 304 and the observation state number 305 in FIG. 4 are similar to the selection state displaying unit 302 and the observation state number 303 in FIG. 3.

Cube switching buttons 306, lamp adjustment buttons 307, stage driving buttons 308, aperture stop adjustment buttons 309, AF buttons 310, revolver switching buttons 311, and DIC prism adjustment buttons 312 are button displays used to instruct the same contents as those of the cube switching buttons 201, the lamp adjustment buttons 202, the stage driving buttons 203, the aperture stop adjustment buttons 204, the AF buttons 206, the revolver switching buttons 205, and the DIC prism adjustment buttons 207 respectively on the operating unit 104 shown in FIG. 2. Additionally, a display of an "IN/OUT" button used for an instruction to insert/extract the DIC prism unit 8 is provided on the observation state setting screen 108 as the DIC prism adjustment button 312. Furthermore, an analyzer switching button 313 is provided as a button display used for an instruction to insert/extract the analyzer unit 13.

As described above, the displays of these operation buttons are used for the instructions of the states of the units, which configure the microscope system, similar to the buttons provided on the operating unit 104. Accordingly, the displays of these buttons may be deleted from the observation state setting screen 108 by using the buttons provided on the operating unit 104 as replacements, if the operating unit 104 is connected to the microscope main body 1.

Set buttons 316 are button displays respectively used to issue an instruction to select the current state of each unit, which is set by using the above described button displays, as an observation state for each unit. Additionally, a setting reset button 317 is a button display used to issue an instruction to erase an observation state selected with the set button 316.

A setting completion button 314 is a button display used to issue an instruction to restore the display screen on the monitor 105 to the observation state setting display screen 107 shown in FIG. 3 after the originally set observation state of the observation state number 305 (the number "1" in the example shown in FIG. 4) is updated to a state newly set on the observation state setting screen 108. Additionally, a setting cancel button 315 is a button display used to issue an instruction to restore the display screen on the monitor 105 to the observation state setting display screen 107 shown in FIG. 3 without updating the observation state of the observation state number 305 (the number "1" in the example shown in FIG. 4).

Figure 5:
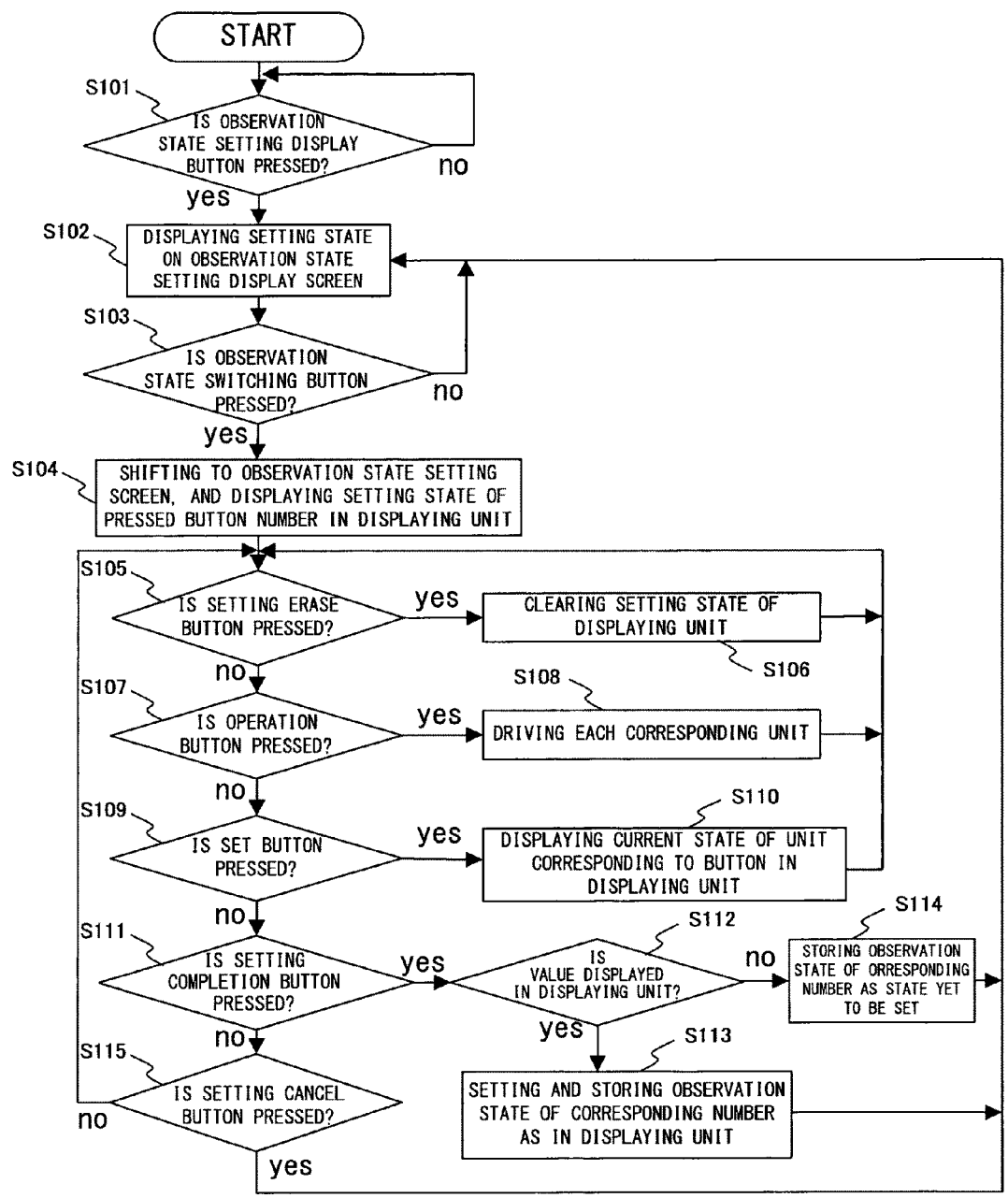
FIG. 5 shows the contents of an observation state setting control process as a flowchart.

FIG. 5 is described next. This figure shows the contents of an observation state setting control process, which is one of control processes executed by the controlling circuit 102, as a flowchart. The processing unit reads and executes a predetermined control program stored in the ROM in the controlling circuit 102, whereby the controlling circuit 102 can execute this observation state setting control process.

Once the observation state setting control process is started, a process for determining whether or not a press operation for an observation state setting display button not shown is detected is executed. The process of S101 is repeated until this press operation is detected (until the determination results in "YES") The observation state setting display button is comprised, for example, on the operating unit 104.

In S102, a process for instructing the computer 106 to display the observation state setting display screen 107 exemplified in FIG. 3 on the monitor 105 is executed.

In S103, a process for determining whether or not a press operation for any of the observation state switching buttons 208 provided on the operating unit 104 is detected is executed. If the press operation is detected and the determination results in "YES", the flow is advanced to the process of S104. Or, if the press operation is not detected and the determination results in "NO", the flow is returned to the process of S103.

In the process of S103, the controlling circuit 102 may concurrently execute a process for determining whether or not a press operation (for example, a click operation performed when a cursor, which is overlaid and displayed on the monitor 105, is moved by operating a mouse device, etc. that the computer 106 comprises as an inputting unit, and the cursor is positioned on the corresponding button display) for a setting screen switching button 301 provided on the observation state setting display screen 107 is detected.

In S104, a process for instructing the computer 106 to switch the display screen on the monitor 105 to the observation state setting screen 108 exemplified in FIG. 4, and for causing the states of the units, which are set for the observation state number 303 corresponding to the setting screen switching button 301 for which the press operation is performed, to be displayed in the selection state displaying unit 304 is executed.

In S105, a process for determining whether or not a press operation for the setting reset button 317 is detected is executed. If this press operation is detected (if the determination results in "YES"), the process is advanced to S106. Or, if the press operation is not detected (if the determination results in "NO"), the process is advanced to S107.

In S106, a process for clearing (erasing) the displays of the states of the units, which are made in the selection state displaying unit 304, is executed. Thereafter, the process is returned to S105, and the above described processes are repeated.

In S107, a process for determining whether or not a press operation for any of the operation buttons, which are provided on the operating unit 104 or the observation state setting screen 108 and intended to issue an instruction to drive each unit, is detected is executed. Here, if this press operation is detected (if the determination results in "YES"), the controlling circuit 102 advances the process to S108. Or, if the press operation is not detected (if the determination results in "NO"), the controlling circuit 102 advances the process to S109.

In S108, a process for providing the driving mechanism 101 or the focusing moving mechanism 103 with a control signal for driving the unit corresponding to the operation button, for which the press operation is detected with the process of S107, to follow the instruction issued with the operation button is executed. Thereafter, the process is returned to S105, and the above described processes are repeated.

In S109, a process for determining whether or not a press operation for the set button 316 is detected is executed. If this press operation is detected (if the determination results in "YES"), the process is advanced to S110. Or, if the press operation is not detected (if the determination results in "NO"), the process is advanced to S111.

In S110, a process for obtaining the current state of the unit corresponding to the set button 316 for which the press operation is detected with the process of S109, and for displaying information, which indicates the state, in a predetermined portion of the selection state displaying unit 304 is executed. Thereafter, the process is returned to S105, and the above described processes are repeated.

In S111, a process for determining whether or not a press operation for the setting completion button 314 is detected is executed. If this press operation is detected (if the determination results in "YES"), the process is advanced to S112. Or, if the press operation is not detected (if the determination results in "NO"), the process is advanced to S115.

In S112, a process for determining in which portion of the selection state displaying unit 304 the information indicating the current state of the unit is displayed is executed. Here, for the unit the information of which is displayed, a process for causing this information to be stored in the nonvolatile memory of the controlling circuit 102 as the value of the state of the unit, which is set for the observation state number 305, is executed in S113. Or, for a unit the information of which is not displayed, a process for causing the value of the state of the unit, which is set for the observation state number 305, to be stored in the nonvolatile memory of the controlling circuit as a state yet to be set is executed in S114.

The process is returned to S102 after the process of the above described S113 or S114 is terminated, and the processes stated earlier are repeated.

In S115, a process for determining whether or not a press operation for the setting cancel button 315 is detected is executed. If this press operation is detected (if the determination results in "YES"), the process is returned to S102, and the above described processes are repeated. Or, if the press operation is not detected (if the determination results in "NO"), the process is returned to S105, and the above described processes are repeated.

The processes described up to this point are the observation state setting control process. The controlling circuit 102 executes this process, whereby a plurality of observation states, which are detected by the sensors of the electrically-operated units comprised by the microscope system, are recorded in the nonvolatile memory by being made to correspond to the observation state number 305, when the press operation for the setting completion button 314 of the operating unit 104 is detected.

Figure 6:
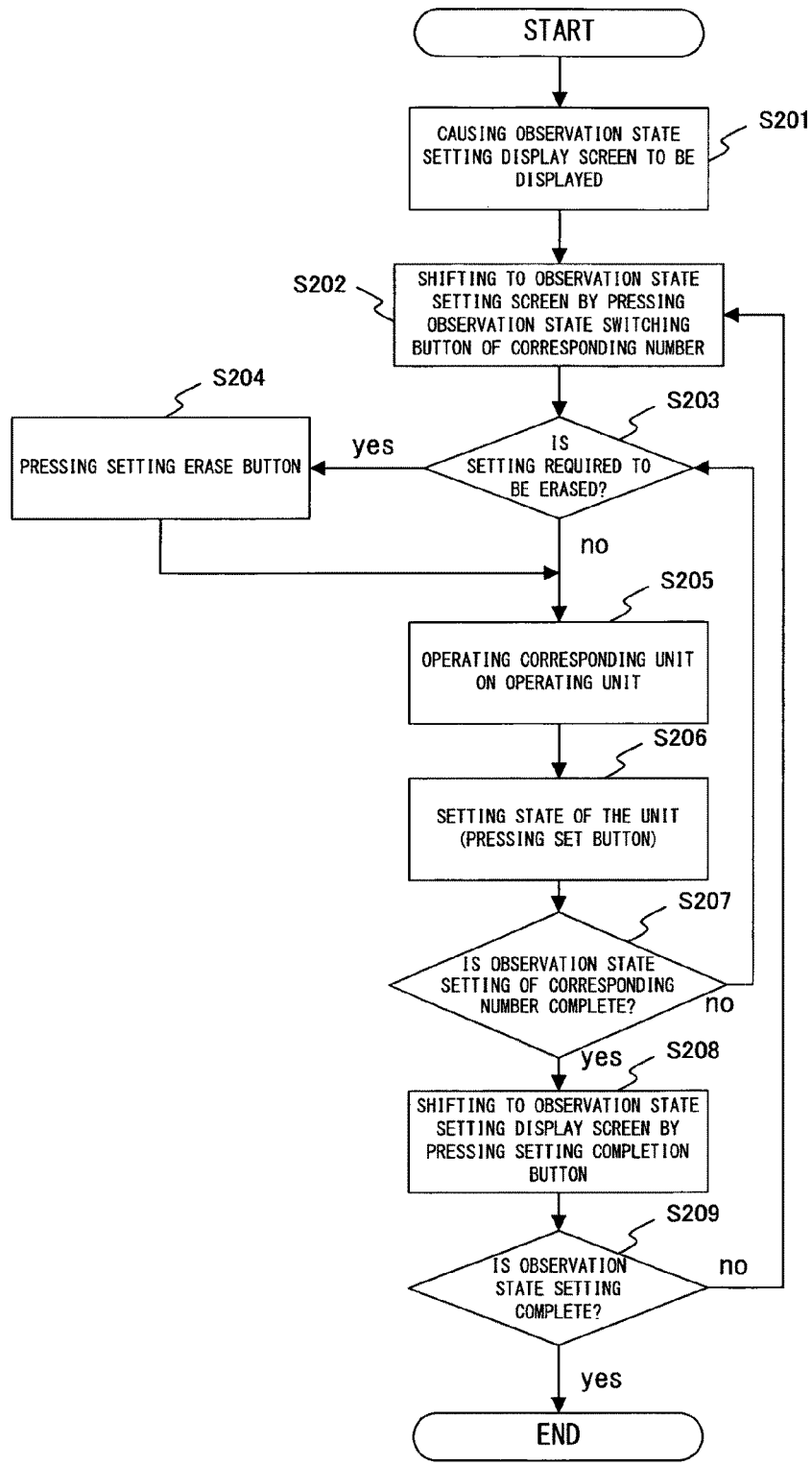
FIG. 6 shows, as a flowchart, operational procedures that an operator performs to set and save the observation states of units in the microscope system.

Operational procedures that an operator performs to set and save the observation states of the units in the microscope system shown in FIG. 1 are described next by using the flowchart shown in FIG. 6.

Initially, in S201, the operator causes the monitor 105 to display the observation state setting display screen 107 by performing a press operation for the above described observation state setting display button. A list of the setting values of the observation states of the units for each of the plurality of (six in FIG. 2) observation state switching buttons 208 provided on the operating unit 104 is displayed in the selection state displaying unit 302 on the observation state setting display screen 107 displayed on the monitor 105 at this time.

Next, in S202, the operator shifts the display on the monitor 105 to the observation state setting screen 108 by performing a press operation for any of the observation state switching buttons 208 (or the setting screen switching buttons 301), which corresponds to the observation state number 303 that the operator desires to change its settings. The currently set observation states of the units for the selected observation state number 305 are displayed in the selection state displaying units 304 of the observation state setting screen 108 displayed on the monitor 105 at this time.

In S203, the operator determines whether or not to erase the settings of the observation state currently displayed in the selection state displaying unit 304. Here, if the operator determines to erase the settings, he or she performs a press operation for the setting reset button 317 in S204. As a result, all of fields of the selection state displaying unit 302 become empty.

In S205, the operator performs a press operation for any of the operation buttons that are provided on the operating unit 104 or the observation state setting screen 108 and intended to issue an instruction to drive each of the units. Then, the unit corresponding to the operation button, for which the press operation is performed, operates in accordance with the instruction issued with the operation button, so that the observation state of the unit changes.

Here, if the observation state of the unit changes to the state desired by the operator, he or she performs a press operation for the button corresponding to the unit among the set buttons 316 in S206. Then, information indicating the state of the unit at this time is displayed in the field corresponding to the unit in the selection state displaying unit 304.

In S207, the operator determines whether or not the settings of the observation states of the units for the selected observation state number 305 are complete. Here, if the operator determines that the settings are complete, the procedures are advanced to S208. Or, if the operator determines that the settings are not complete, the procedures are returned to S203, and the above described procedures are repeated.

In S208, the operator shifts the display on the monitor 105 to the observation state setting display screen 107 by performing a press operation for the setting completion button 314. At this time, information indicating the states of the units, which are displayed in the selection state displaying unit 304, is stored in the nonvolatile memory of the controlling circuit 102 by being made to correspond to the observation state number 305.

In S209, the operator determines whether nor not the settings of the observation states of the units for all of the observation state numbers 303 are complete. Here, if the operator determines that all of the settings are complete, the observation state setting operational procedures shown in FIG. 6 are terminated. Or, if the operator determines that all of the settings are not complete, the procedures are returned to S202, and the above described procedures are repeated.

The operator performs the above described procedures, whereby the observation states of the units of the microscope system are set and saved.

Usage of the microscope system configured as described above is described next.

Assume the case where an operator examines a sample. At this time, the operator sets and saves the observation states of the units in the microscope system by operating the microscope system in accordance with the operational procedures shown in FIG. 6 prior to an examination.

Thereafter, the sample is observed in the examination while switching the observation state of the microscope system by sequentially selecting and pressing the observation state switching buttons 208. Upon completion of the selections of the buttons the settings of which are saved, the examination of the sample is terminated.

Here, FIG. 7 is described. This figure shows the contents of a first example of an observation state switching process, which is one of the control processes executed by the controlling circuit 102, as a flowchart. This process is a process for implementing the switching of an observation state according to the press operation of any of the observation state switching buttons 208. The processing unit reads and executes a predetermined control program stored in the ROM in the controlling circuit 102, whereby the controlling circuit 102 can execute the observation state switching process.

In FIG. 7, initially in S301, a process for determining whether or not a press operation for any of the observation state switching buttons 208 is detected is executed. The process of S301 is repeated until this press operation is detected (until the determination results in "YES").

In S302, a process for obtaining the number assigned to the observation state switching button 208 the press operation of which is detected is executed.

In S303, a process for reading and obtaining information indicating the observation states of the units, which are stored by being made to correspond to the obtained number (observation state number), from the nonvolatile memory of the controlling circuit 102 is executed.

In S304, a process for providing the driving mechanism 101 or the focusing moving mechanism 103 with a control signal, and for changing the observation states of the units of the microscope system shown in FIG. 1 to follow the obtained information is executed. Thereafter, the process is returned to S301, and the above described processes are repeated.

The processes described up to this point are the first example of the observation state switching process. The controlling circuit 102 executes this process, whereby an operation for switching the observation states of the units to states corresponding to the number of the observation state switching button 208, the press operation of which is detected, among observation states stored in the nonvolatile memory is performed in the microscope system shown in FIG. 1 by controlling the electrically-operated units comprised by the microscope system each time a press operation for any of the observation state switching buttons 208 of the operating unit 104 is detected.

As described above, according to this implementation example, the observation procedures are saved as observation state settings as described above in the microscope system shown in FIG. 1, whereby an operator can push ahead with an examination of a sample only by sequentially selecting and pressing the observation state switching buttons 208 of the operating unit 104. This facilitates complicated examination operations, which an operator must conventionally perform by switching among objective lenses or observation methods, by operating attached units, and by adjusting the diameter of an aperture stop, a lamp, etc., with the use of observation procedures that the operator memorizes, or with the reference of a manual, etc., leading to an increase in the efficiency of an examination.

Additionally, another examination procedures to be performed, for example, when a fault is found in a sample may be preregistered in the microscope system shown in FIG. 1. In this case, the sample can be observed by switching the observation state with the press of the setting switching buttons 211 or 318 during the examination when the fault is found in the sample in the examination. Therefore, the examination can be pushed ahead with ease.

As described above, according to this implementation example, an observation state can be switched with ease in the microscope system shown in FIG. 1, whereby easier and more efficient observation can be made with high operability.

In the above described implementation example, only one setting reset button 317 is provided on the observation state setting screen 108. Alternatively, setting reset buttons 317 may be provided respectively for the units like the set buttons 316, and the display of information about an observation state may be erased for each of the units. Additionally, a button for issuing an instruction not to set the state of each of the units may be provided instead of providing the setting reset button 317 for issuing an instruction to once erase setting information.

Furthermore, if a unit is attachable/detachable to/from the microscope main body 1, a sensor for detecting that the unit is connected to the microscope main body 1, and for notifying the controlling circuit 102 may be provided, and the controlling circuit 102 may instruct the computer 106 not to display the operation buttons, the selection state displaying unit 302, etc. of an unconnected unit on the observation state setting display screen 107 and the observation state setting screen 108. Or, the operation buttons, the selection state displaying unit 302, etc. of an unused unit may be made invisible on the observation state setting display screen 107 and the observation state setting screen 108 by operator's selecting a unit to be used in advance, and by instructing the controlling circuit 102, instead of providing a sensor.

Still further, in this implementation example, the set buttons 316 are provided respectively for the units on the observation state setting screen 108. Alternatively, only one set button 316 may be provided on the observation state setting screen 108 like the setting reset button 317, and information about the observation states of all of the units may be displayed altogether. Or, a unit for displaying information about the observation states altogether may be made selectable with a button, etc., and only information about the observation state of a selected unit may be displayed in the selection state displaying unit 302 according to a press operation performed for the set button 316, instead of displaying the information about the observation states of all of the units altogether.

Sill further, in this implementation example, when a press operation is performed for any of the set buttons 316, information indicating the observation states of the units of the microscope system at that time point is displayed in the selection state displaying unit 302. Alternatively, information display may be made as follows. Namely, another combination of displaying units for displaying information about the observation states of the units is provided on the observation state setting screen 108 separately from the selection state displaying units 302. When a press operation is performed for any of the operation buttons, which are provided on the operating unit 104 or the observation state setting screen 108 and intended to issue an instruction to drive each of the units, display information in a newly provided display unit is updated without operating the unit corresponding to the operation button for which the press operation is performed. If a press operation is performed for the corresponding set button 316 thereafter, the display information in the newly provided displaying unit at that time point is reflected on the selection state displaying unit 302.

Still further, a unit corresponding to an operation button, for which a press operation is performed, may be operated when the press operation is performed for any of the operation buttons, which are provided on the operating unit 104 or the observation state setting screen 108 and intended to issue the instruction to drive each of the units, and at the same time, the corresponding set button 316 may be deleted from the observation state setting screen 108 by immediately displaying information, which indicates the observation state of the unit after being operated, in the selection state displaying unit 302.

Still further, in this implementation example, the settings of the observation states of the units are made by using the various types of button displays comprised on the observation state setting screen 108. Alternatively, these settings may be made by using button switches provided on the operating unit 104. For example, if a press operation is performed for one of the observation state switching buttons 208 subsequently to a press operation performed for the set button 209 on the operating unit 104 shown in FIG. 2, the controlling circuit 102 stores information indicating the observation states of the units at that time point by making the information correspond to the observation state number corresponding to the button for which the press operation is performed. Or, if a press operation is performed for one of the observation state switching buttons 208 subsequently to a press operation performed for the setting erase button 210, the controlling circuit 102 erases the storage of the information indicating the observation states of the units, which are stored by being made to correspond to the observation state number corresponding to the number of the button for which the press operation is performed. Observation states may be set/erased in this way.

Still further, the number of the observation state switching buttons 208 on the operating unit 104 shown in FIG. 2, and that of the observation state numbers 303 on the observation state setting display screen 107 shown in FIG. 3 are assumed to be 6 respectively. However, these numbers may be smaller or larger.

Still further, in this implementation example, the settings of the observation states of the units are stored and held in the nonvolatile memory within the controlling circuit 102. Alternatively, these settings may be stored in the RAM within the controlling circuit 102, or in the storage device comprised by the computer 106. Moreover, the settings may be stored on a portable storage medium such as a memory card, etc., which is insertable/extractable to/from the computer 106.

Still further, in this implementation example, one combination of six settings of the observation states of the units can be saved. Alternatively, a plurality of combinations of the observation states of the units may be saved in the controlling circuit 102, and one of the plurality of combinations of the observation states saved may be selected and reproduced if the settings of the observation states are reproduced. In this case, it is better to switch a correspondence between each of the numbers of the observation state switching buttons 208 (namely, the observation state numbers 303) and the settings of the observation states of the units of each combination according to a press operation performed for either of the setting switching buttons 211 on the operating unit 104 or the setting switching buttons 318 on the observation state setting display screen 107.

A configuration for operating the microscope system shown in FIG. 1 in the above described way is explained below.

FIG. 8 is described first. This figure shows part of a memory map of the nonvolatile memory comprised by the controlling circuit 102.

This memory map indicates that a plurality of observation states that are made to correspond to the observation state numbers are recorded in the nonvolatile memory by collecting the states of the insertion/extraction of the units in/from the optical path, or the states of opening/closing of the units into one observation state, and a plurality of combinations each composed of a plurality of observation states are recorded and saved in the nonvolatile memory.

Here, FIG. 9 is described. This figure shows the contents of a setting switching process, which is one of the control processes executed by the controlling circuit 102, as a flowchart. This process is a process for selecting one of a plurality of stored combinations of the observation states of the units of the microscope system shown in FIG. 1 according to a press operation performed for either of the setting switching buttons 211 or 318 in the microscope system. The processing unit reads and executes a predetermined control program stored in the ROM in the controlling circuit 102, whereby the controlling circuit 102 can execute this setting switching process.

In FIG. 9, a process for assigning "1" to a variable m is initially executed in S401.

In S402, a process for determining whether or not a press operation for either of the setting switching buttons 211 or 318 is detected is executed. The process of S402 is repeated until this press operation is detected (until the determination results in "YES").

In S403, a process for determining whether the setting switching button 211 or 318, the press operation of which is detected, indicates either a change in an ascending order ("NEXT" button) or a change in a descending order ("BACK" button) is executed. If it is determined that the button indicates a change in the ascending order, the controlling circuit 102 advances the process to S404. Or, if it is determined that the button indicates a change in the descending order, the controlling circuit 102 advances the process to S407.

In S404, a process for reassigning a result, which is obtained by adding "1" to the current value of the variable m, to the variable m is executed.

In S405, a process for determining whether or not the current value of the variable m exceeds the total number of combinations of observation states stored in the nonvolatile memory is executed. Here, if it is determined that the value of the variable m exceeds the total number (if the determination results in "YES"), the process is advanced to S406. Or, if it is determined that the value of the variable m is equal to or smaller than the total number (if the determination results in "NO"), the process is advanced to S410.

In S406, a process for reassigning "1" to the variable m is executed. Thereafter, the process is advanced to S410.

In S407, a process for reassigning a result, which is obtained by subtracting "1" from the current value of the variable m, to the variable m is executed.

In S408, a process for determining whether or not the current value of the variable m becomes smaller than "1" is executed. Here, if it is determined that the value of the variable m becomes smaller than "1" (the determination results in "YES"), the process is advanced to S409. Or, if it is determined that the value of the variable m is equal to or larger than "1" (if the determination results in "NO"), the process is advanced to S410.

In S409, a process for assigning the numerical value, which indicates the total number of combinations of observation states, which are stored in the nonvolatile memory, to the variable m is executed.

In S410, a process for reading information, which is stored as data of an mth combination in the nonvolatile memory and indicates the observation states of the units, and for storing the information in the RAM within the controlling circuit 102 is executed. Thereafter, the process is returned to S402, and the above described processes are repeated.

The processes described up to this point are the setting switching process. When this process is executed, the information indicating the observation states of the units is read not from the nonvolatile memory but from the storage region of the RAM, in which the information indicating the observation states of the units is stored with the above described process of S410, in the process of S303 in the observation state switching process shown in FIG. 7. As a result, the controlling circuit 102 controls the electrically-operated units comprised by the microscope system, and an operation for switching the observation states of the units to observation states included in a combination, which is selected with a press operation performed for either of the setting switching buttons 211 or 218, among the observation states stored in the nonvolatile memory is performed in the microscope system shown in FIG. 1.

The settings of the plurality of combinations of the observation states may be colleted into one group, and the saving of the settings of a plurality of groups may be enabled, by way of example, for each user or each sample in the controlling circuit 102, instead of saving the settings of the plurality of combinations of the observation states of the units as described above.

Additionally, in this implementation example, an operating mode for switching an observation state (an operating mode in which the controlling circuit 102 executes the observation state switching process shown in FIG. 7) and an operating mode in which normal observation is made may be made easily switchable and available as the operating mode of the microscope system shown in FIG. 1. Namely, the controlling circuit 102 may switch between the above described two operating modes according to a press operation performed, for example, for the state switching button 212 provided on the operating unit 104 shown in FIG. 2.

Figure 10:
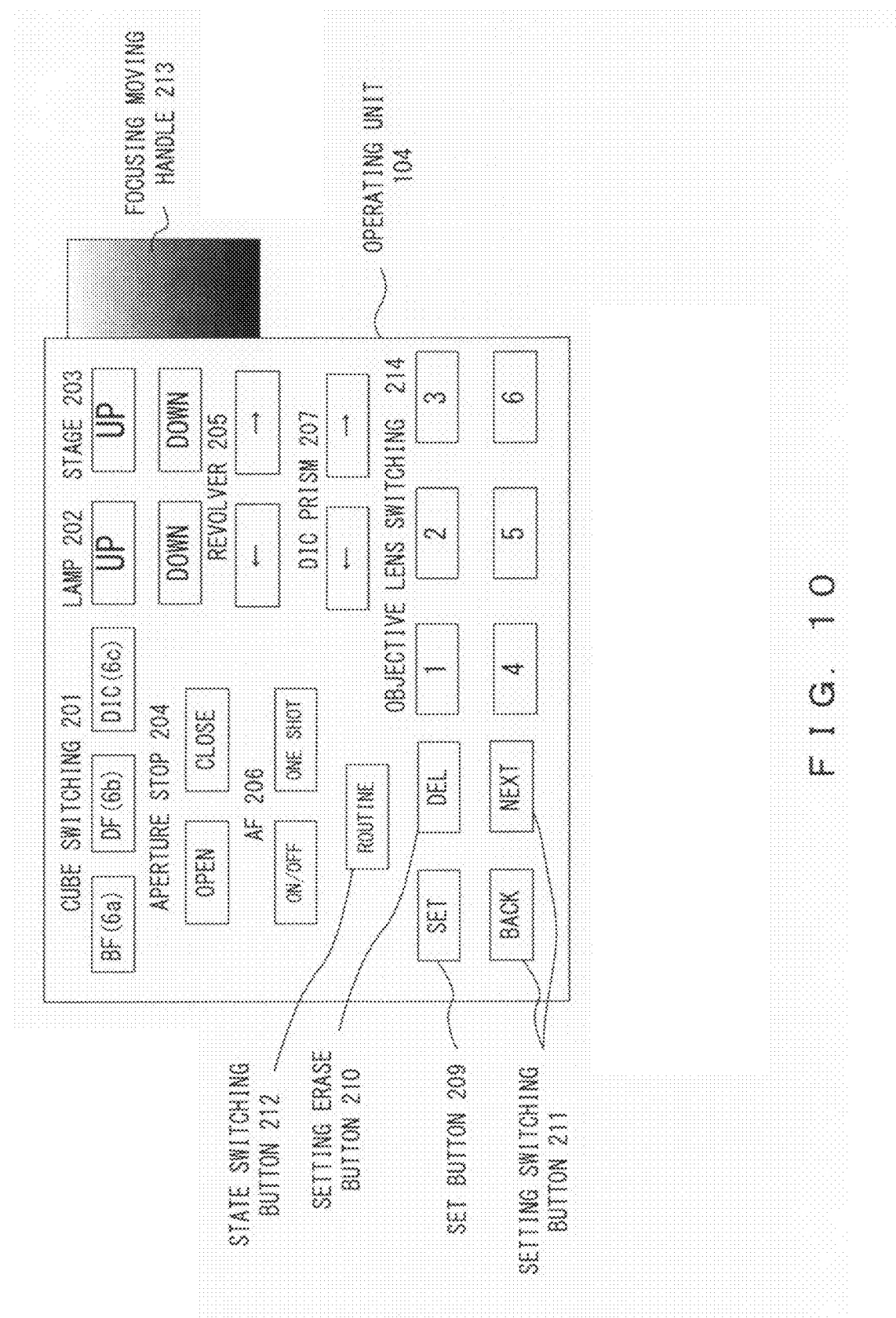
FIG. 10 explains a change in the function of buttons provided in the operating unit shown in FIG. 2.

In such a case, the buttons in the observation state switching mode, which function as the observation state switching buttons 208 in FIG. 2, may function as objective lens switching buttons 214 for obtaining an instruction to switch the selections of the objective lenses 9 made by rotating the revolving nosepiece 7 as shown in FIG. 10. The functions of the group of buttons comprised by the operating unit 104 as the observation state switching buttons 208 are made switchable according to a press operation performed for the state switching button 212 as described above, whereby the number of components of the operating unit 104 can be reduced, leading to reductions in the cost and the size of the operating unit 104.

Figure 11:
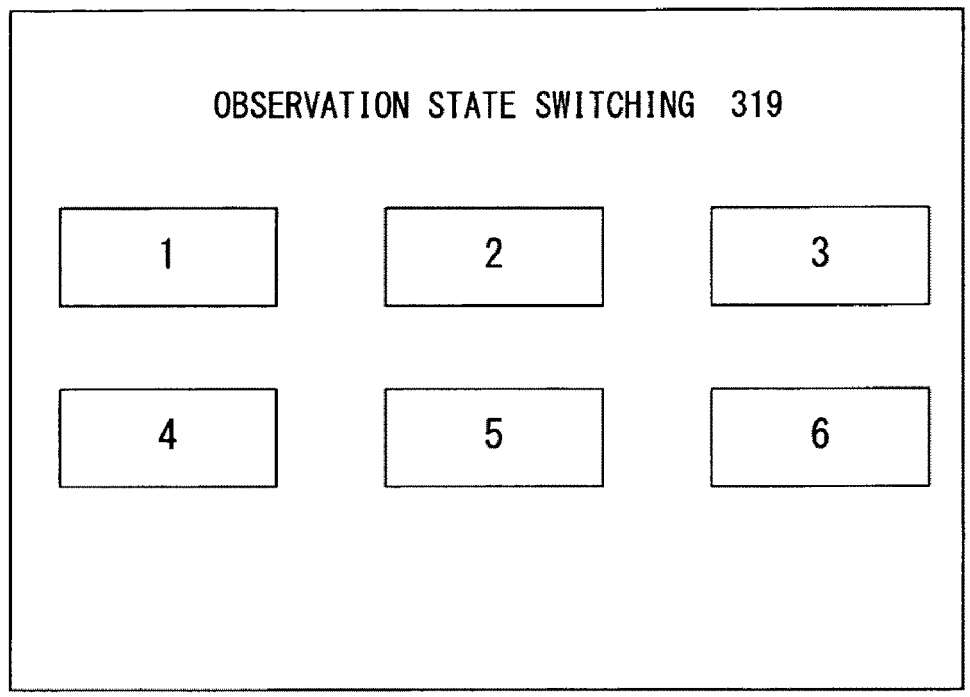
FIG. 11 shows a first example of an observation state switching screen.

Furthermore, in the observation state switching mode, the examination procedures may be pushed ahead more easily by implementing the display screen of the monitor 105 as a screen of only observation state switching buttons 319 as in the first example of the observation state switching screen shown in FIG. 11, and by causing the controlling circuit 102 to switch the observation states of the units according to a press operation performed for these button displays. At this time, the buttons of the operating unit 104 may be implemented only as the observation state switching buttons by configuring the operating unit 104 with a touch panel, instead of configuring the display screen of the monitor 105 as that shown in FIG. 11.

Still further, a shift may be made from the observation state switching mode to the normal observation mode when the stage 10 is moved downward by a predetermined distance, instead of switching between the observation state switching mode and the normal observation mode according to a press operation performed for the state switching button 212. Alternatively, switching may be made between the above described two modes by performing an operation, which satisfies a particular condition, such as a condition under which a press operation is performed for a predetermined button by a prespecified number of times within a preset time period, a condition under which a simultaneous press operation is performed for two particular buttons, or a condition under which a press operation continues to be performed for a particular button for a prespecified time or more.

IMPLEMENTATION EXAMPLE 2

Figure 12:
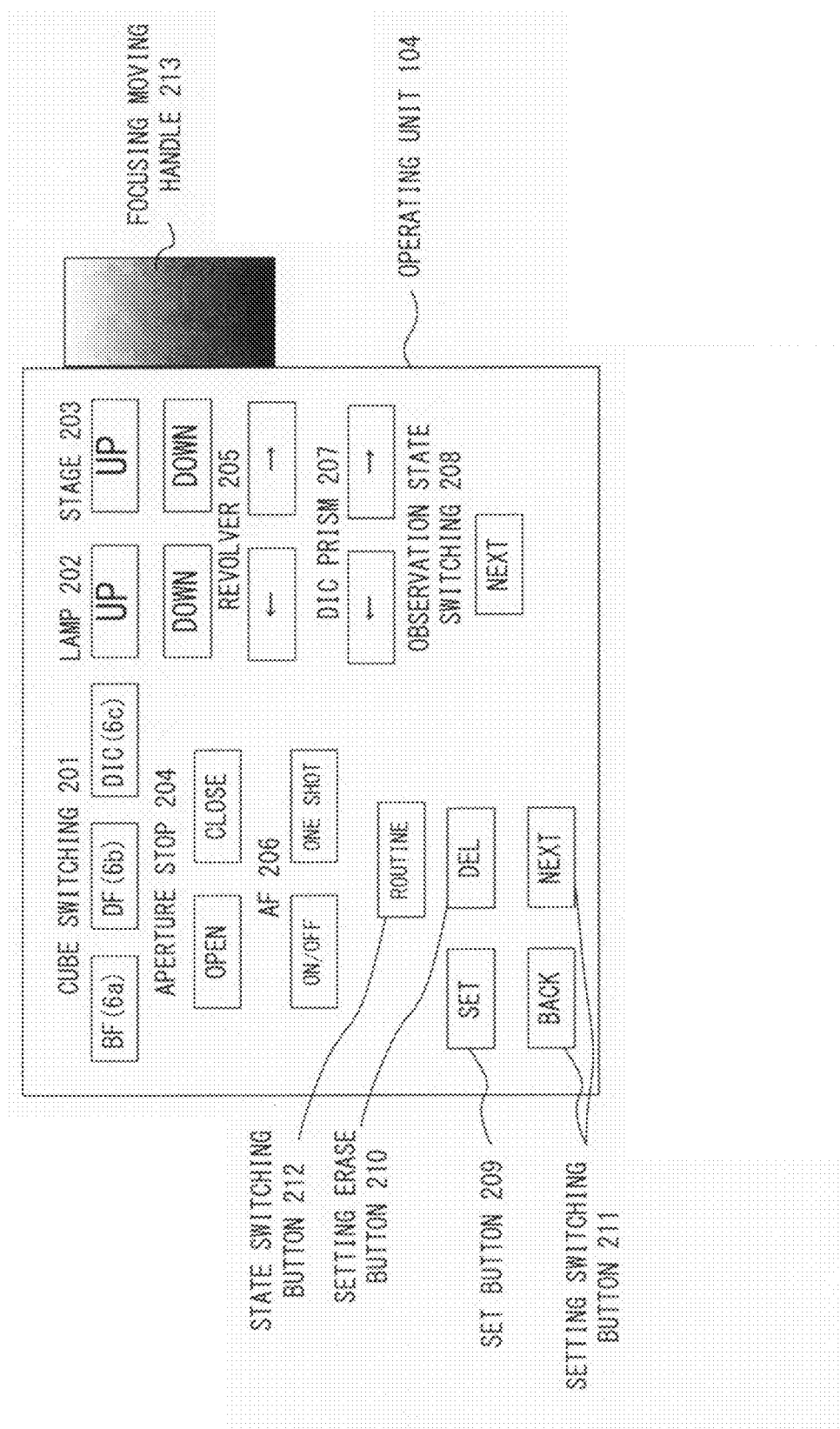
FIG. 12 shows a second configuration example of the operating unit.

FIG. 12 is described first. This figure shows a second configuration example of the operating unit 104 in the microscope system shown in FIG. 1.

The operating unit 104 shown in FIG. 12 is different from the first example shown in FIG. 2 only in a point that the number of observation state switching buttons 208 is one.

Configurations of the observation state setting display screen 107 and the observation state setting screen 108 in this implementation example are assumed to be similar to those in the implementation example 1 shown in FIGS. 3 and 4. Accordingly, the observation state numbers 303 range from "1" to "6" also in this implementation example.

In this implementation example, the controlling circuit 102 sequentially switches the selection of the observation state number 303 in ascending order according to a press operation repeatedly performed for the only one observation state switching button 208. However, if the press operation is performed after the selection reaches the maximum number ("6" here), the controlling circuit 102 switches the selection of the observation state number 303 to the minimum number ("1" here), so that the switching among the selections of the numbers is circulated.

Usage of the microscope system configured as described above is explained.

Assume the case where an operator examines a sample. At this time, the operator initially sets and saves the observation states of the units in the microscope system by operating the microscope system according to the operational procedures shown in FIG. 6 prior to an examination in a similar manner as in the implementation example 1.

Thereafter, the operator observes the sample while sequentially switching the observation state of the microscope system by repeatedly performing a press operation for the observation state switching button 208 in the examination of the sample. Upon completion of all the press operations of the button, the settings of which are saved, the examination of the sample is terminated.

Figure 13:
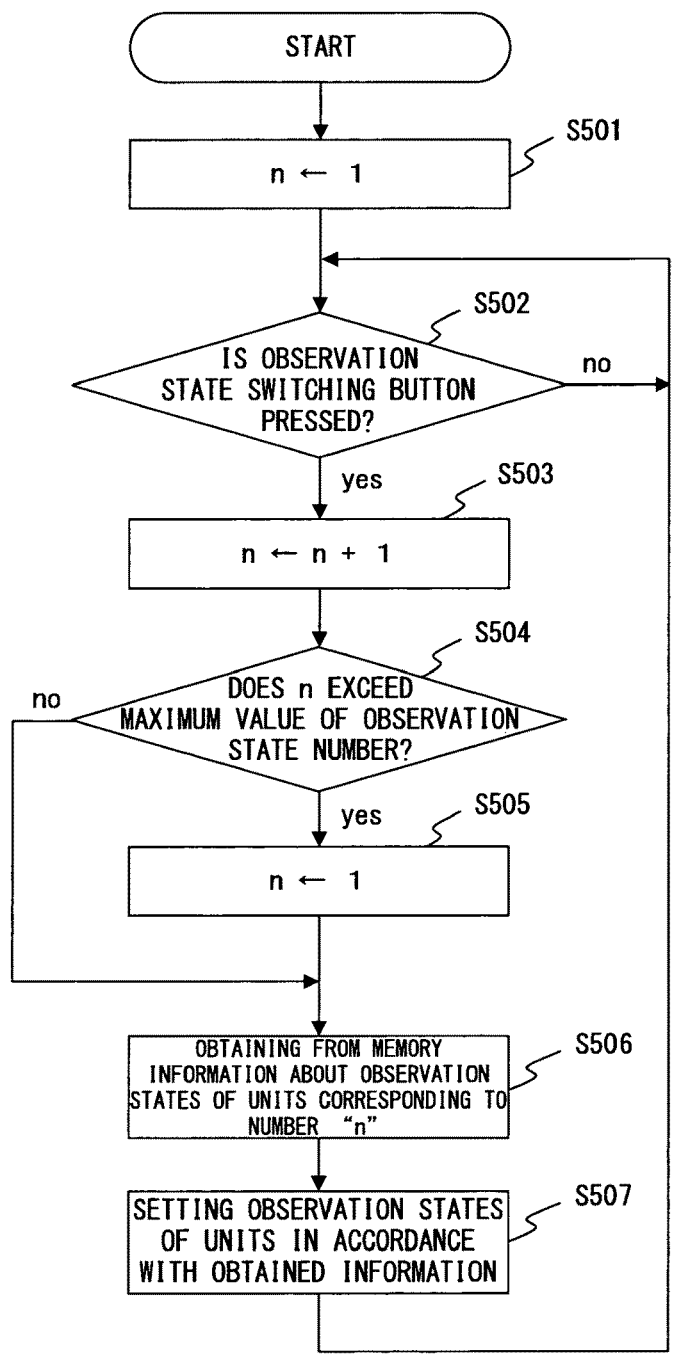
FIG. 13 shows the contents of a second example of the observation state switching process as a flowchart.

Here, FIG. 13 is described. This figure shows the contents of a second example of the observation state switching process, which is one of the control processes executed by the controlling circuit 102, as a flowchart. This process is a process for implementing the switching of an observation state according to the press operation of the observation state switching button 208 on the operating unit 104 shown in FIG. 12 in the microscope system shown in FIG. 1. The processing unit reads and executes a predetermined control program stored in the ROM in the controlling circuit 102, whereby the controlling circuit 102 can execute the observation state switching process.

In FIG. 13, a process for assigning "1" to a variable n is initially executed in S501.

In S502, a process for determining whether or not a press operation for the observation state switching button 208 on the operating unit 104 shown in FIG. 12 is detected is executed. The process of S502 is repeated until this press operation is detected (until the determination results in "YES").

In S503, a process for reassigning a result, which is obtained by adding "1" to the current value of the variable n, to the variable n is executed.

In S504, a process for determining whether or not the current value of the variable n exceeds the maximum value of the observation state number 303 is executed. Here, if it is determined that the value of the variable n exceeds the maximum number of the observation state number 303 (if the determination results in "YES"), the process is advanced to S505. Or, if it is determined that the value of the variable n is equal to or smaller than the maximum value of the observation state number 303 (if the determination results in "NO"), the process is advanced to S506.

In S505, a process for reassigning "1" to the variable n is executed.

In S506, a process for reading and obtaining information indicating the observation states of the units, which is stored by being made to correspond to the number n of the observation state number 303, from the nonvolatile memory of the controlling circuit 102 is executed.

In S507, a process for providing the driving mechanism 101 or the focusing moving mechanism 103 with a control signal, and for changing the observation states of the units of the microscope system shown in FIG. 1 to follow the obtained information is executed. Thereafter, the process is returned to S502, and the above described processes are repeated.

The processes described up to this point are the second example of the observation state switching process. The controlling circuit 102 executes this process, whereby an operation for sequentially switching the observation states of the units to any of observation states stored in the nonvolatile memory in the order of the observation state numbers 303 by controlling the electrically-operated units comprised by the microscope system each time a press operation for the only one observation state switching button 208 provided on the operating unit 104 is detected is performed in the microscope system shown in FIG. 1.

As described above, according to this implementation example, the number of places of operations for switching an observation state is further reduced in the microscope system shown in FIG. 1, whereby an observation state can be switched more easily, and the number of times that an operator views the operating unit 104 can be reduced. Accordingly, easier and efficient observation can be made with high operability.

In this implementation example, the controlling circuit 102 circulates the switching among the selections of the observation state numbers 303 according to the press operation repeatedly performed for the observation state switching button 208. Alternatively, the controlling circuit 102 may shift the operating mode of the microscope system from the observation state switching mode (the operating mode in which the controlling circuit 102 executes the observation state switching process shown in FIG. 13) to the normal observation mode, if the press operation is performed after the selection of the observation state number 303 reaches the maximum number.

Additionally, an operator may preset the order of switching among the selections of the observation state numbers 303, instead of sequentially switching the selections of the observation state numbers 303 in ascending order according to the press operation repeatedly performed for the observation state switching button 208.

Furthermore, switching may be made by skipping a number, for which the settings of the observation states of the units are not made, from the order of switching of the selections of the observation state numbers 303 when the selections of the observation state numbers 303 are sequentially switched according to the press operation repeatedly performed for the observations state switching button 208. Or, switching may be made by skipping also a number, which is preset by an operator and for which the settings of the observation states of the units are made, from the order of switching of the selections.

Figure 14:
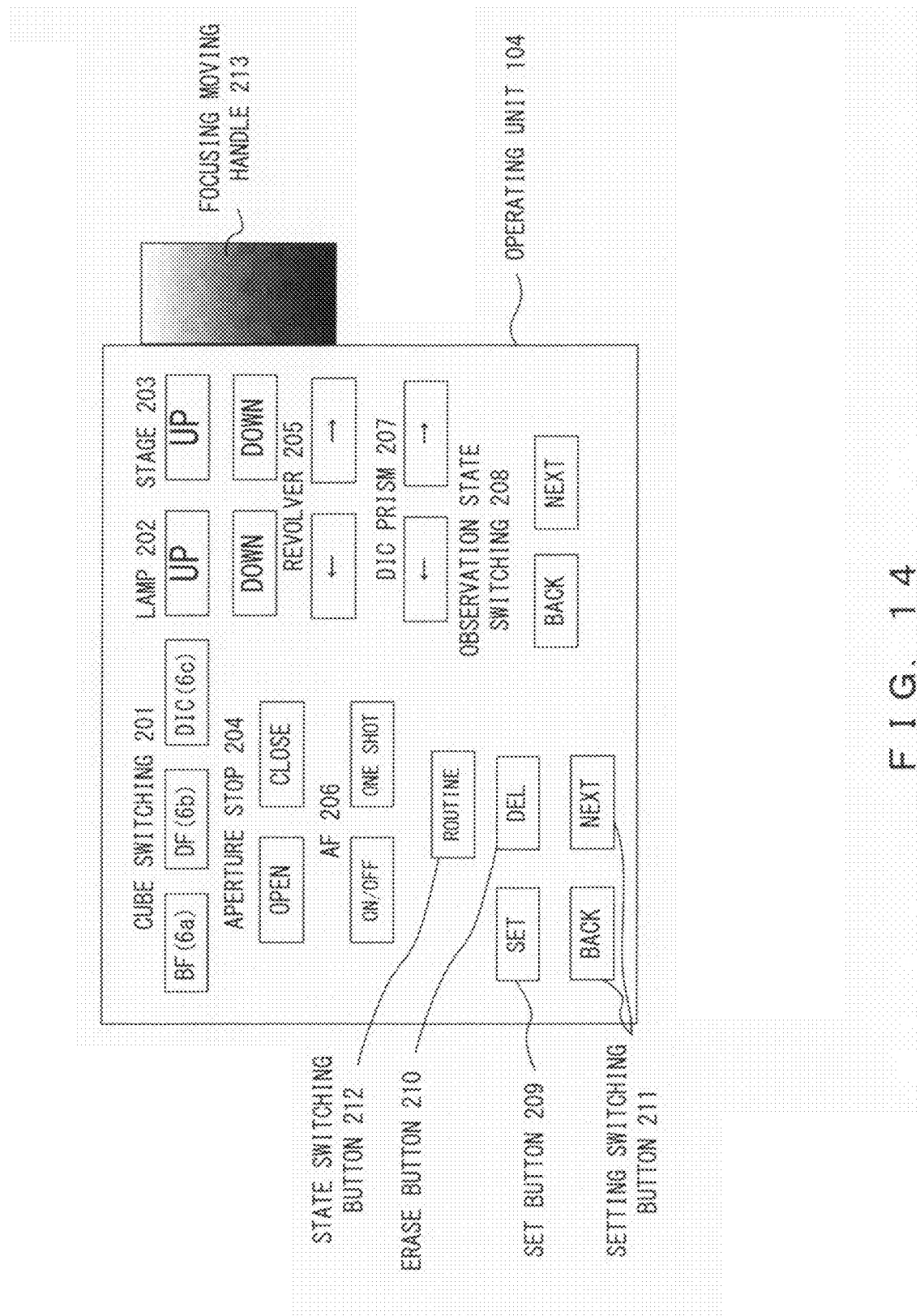
FIG. 14 shows a third configuration example of the operating unit.

Still further, in this implementation example, the number of observation state switching buttons 208 on the operating unit 104 is implemented as only one. Alternatively, the number of observation state switching buttons 208 provided on the operating unit 104 may be implemented as two as in FIG. 14 that shows a third configuration example of the operating unit 104 in the microscope system sown in FIG. 1. In this case, one of the buttons 208 may be implemented as a button for issuing an instruction to switch among the selections of the observation state numbers 303 in ascending order, whereas the other of the buttons 208 may be implemented as a button for issuing an instruction to switch among the selections of the observation state numbers 303 in descending order. As a result, an operator can switch an observation state with ease of use even if he or she switches the observation state with an erroneous operation of the observation state switching button 208, or if he or she desires to again verify already finished observation.

Here, FIG. 15 is described. This figure shows the contents of a third example of the observation state switching process, which is one of the control processes executed by the controlling circuit 102, as a flowchart. This process is a process for implementing the switching of an observation state according to the press operation of either of the observation state switching buttons 208 on the operating unit 104 shown in FIG. 14 in the microscope system shown in FIG. 1. The processing unit reads and executes a predetermined control program stored in the ROM in the controlling circuit 102, whereby the controlling circuit 102 can execute this observation state switching process.

In FIG. 15, a process for assigning "1" to a variable n is initially executed in S601.

In S602, a process for determining whether or not a press operation for either of the observation state switching buttons 208 is detected is executed. The process of S602 is repeated until this press operation is detected (until the determination results in "YES").

In S603, a process for determining whether the observation state switching button 208, the press operation of which is detected, indicates either a change in an ascending order ("NEXT" button) or a change in a descending order ("BACK" button) is executed. If it is determined that the button indicates a change in the ascending order, the controlling circuit 102 advances the process to S604. Or, if it is determined that the button indicates a change in the descending order, the controlling circuit 102 advances the process to S607.

In S604, a process for reassigning a result, which is obtained by adding "1" to the current value of the variable n, to the variable n is executed.

In S605, a process for determining whether or not the current value of the variable n exceeds the maximum value of the observation state number 303 is executed. Here, if it is determined that the value of the variable n exceeds the maximum number of the observation state number 303 (if the determination results in "YES"), the process is advanced to S606. Or, if it is determined that the value of the variable n is equal to or smaller than the maximum value of the observation state number 303 (if the determination results in "NO"), the process is advanced to S610.

In S606, a process for reassigning "1" to the variable n is executed. Thereafter, the process is advanced to S610.

In S607, a process for reassigning a result, which is obtained by subtracting "1" from the current value of the variable n, to the variable n is executed.

In S608, a process for determining whether or not the current value of the variable n becomes smaller than "1" is executed. Here, if it is determined that the value of the variable n becomes smaller than "1" (if the determination results in "YES"), the process is advanced to S609. Or, if it is determined that the value of the variable n is equal to or larger than "1" (if the determination results in "NO"), the process is advanced to S610.

In S609, a process for assigning the maximum value of the observation state number 303 to the variable n is executed.

In S610, a process for reading and obtaining information indicating the observation states of the units, which are stored by being made to correspond to the number n of the observation state number 303, from the nonvolatile memory of the controlling circuit 102 is executed.

In S611, a process for providing the driving mechanism 101 or the focusing moving mechanism 103 with a control signal, and for changing the observation states of the units of the microscope system shown in FIG. 1 to follow the obtained information is executed. Thereafter, the process is returned to S602, and the above described processes are repeated.

The processes described up to this point are the third example of the observation state switching process. The controlling circuit 102 executes this process, whereby an operation for sequentially switching the observation states of the units to any of observation states stored in the nonvolatile memory in ascending or descending order of the observation state numbers 303 by controlling the electrically-operated units comprised by the microscope system each time the press operation is performed for either of the two observation state switching buttons 208 provided on the operating unit 104 is performed in the microscope system shown in FIG. 1.

In this implementation example, the observation state switching buttons 208 are provided on the operating unit 104. Alternatively, the observation state switching buttons 208 may be provided on a GUI screen to be displayed on the monitor 105, and an instruction to switch an observation state, which is issued from an operator, may be received via the GUI screen. Or, the observation state switching buttons 208 may be provided in a dedicated unit separately from the operating unit 104. Otherwise, a voice recognition process may be executed for the instruction to switch an observation state after receiving the voice of an operator, and the order of switching of the selections of the observation states (a determination of ascending or descending order) may be determined according to the result of the voice recognition process.

IMPLEMENTATION EXAMPLE 3

Figure 16:
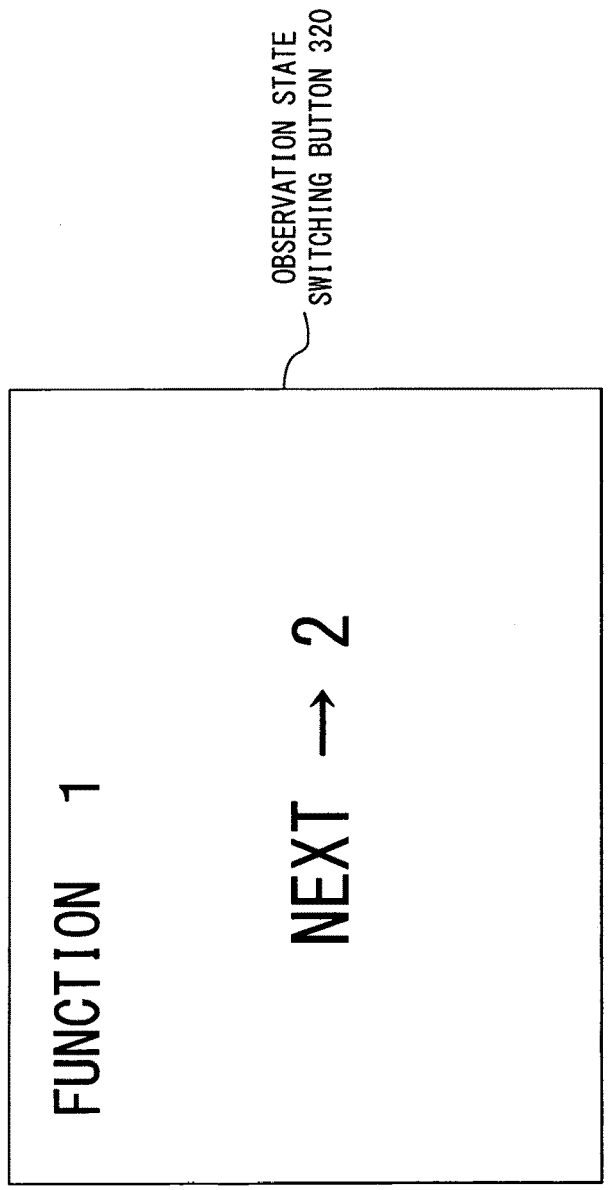
FIG. 16 shows a second example of an observation state switching screen.

FIG. 16 is described first. This figure shows a second example of the observation state switching screen. The observation state switching screen that the computer 106 causes the monitor 105 to display is characterized in a point that the entire screen is implemented as an observation state switching button 320, which is a button display used for an instruction to switch the observation states of the units of the microscope system, which are preset and stored.

Configurations of the observation state setting display screen 107 and the observation state setting screen 108 in this implementation example are similar to those in the implementation example 1, which are shown in FIGS. 3 and 4. Accordingly, the observation state numbers 303 range from "1" to "6" also in this implementation example.

In this implementation example, the controlling circuit 102 sequentially switches the selection of the observation state number 303 in ascending order in a similar manner as in the implementation example 2 according to a press operation repeatedly performed for the observation state switching button 320. However, if the press operation is performed after the selection reaches the maximum number ("6" here), the controlling circuit 102 switches the selection of the observation state number 303 to the minimum number ("1" here), so that the switching of the selection of the number is circulated.

Usage of the microscope system configured as described above is explained.

Assume the case where an operator examines a sample. At this time, the operator initially sets and saves the observation states of the units in the microscope system by operating the microscope system according to the operational procedures shown in FIG. 6 prior to an examination in a similar manner as in the implementation example 1.

Thereafter, the operator observes the sample while sequentially switching the observation state of the microscope system by repeatedly performing a press operation for the observation state switching button 320 in the examination of the sample. Upon completion of all the selections of the button, the settings of which are saved, the examination of the sample is terminated.

To implement the switching of the observation state according to the press operation performed for the observation state switching button 320, the controlling circuit 102 may be made to execute the second example of the observation state switching process the contents of which are shown in FIG. 13. However, in the process of S502 shown in FIG. 13, whether or not the press operation for the observation state switching button 320 is detected is determined instead of determining whether or not the press operation for the observation state switching button 208 on the operating unit 104 is detected.

As described above, according to this implementation example, the observation state switching button 320 is provided as a button display on the display screen of the monitor 105 as a single operating unit separately from the microscope system. As a result, the place of an operation for switching the observation state of the microscope system shown in FIG. 1 can be made arbitrary within the screen. Therefore, an operator can switch the observation state while continually observing a sample without viewing the screen at all.

Figure 17:
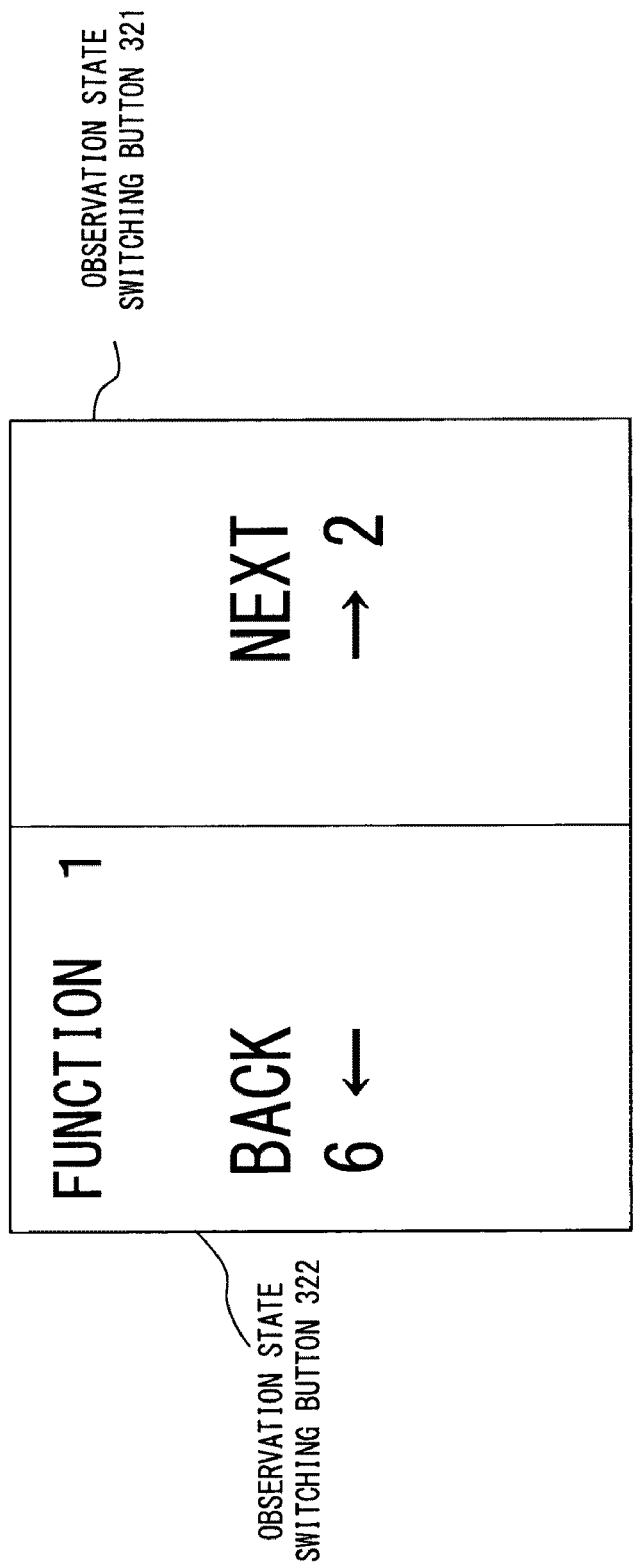
FIG. 17 shows a third example of the observation state switching screen.

In this implementation example, the number of observation state switching buttons 320 on the screen is implemented as one. Alternatively, two observation state switching buttons may be provided as button displays on the display screen of the monitor 105 on a single operating unit separately from the microscope system. Namely, as shown in FIG. 17 that shows a third example of the observation state switching screen, the entire screen may be partitioned into two, which are implemented as observation state switching buttons 321 and 322 respectively. In this case, the observation state switching button 321 may be implemented as a button for an instruction to switch the selection of the observation state number 303 in ascending order, whereas the observation state switching button 322 may be implemented as a button for an instruction to switch the selection of the observation state number 303 in descending order. With button displays formed by partitioning the entire screen into two or so, an operator can switch an observation state while continually observing a sample without viewing the screen at all. Moreover, the operator can switch the observation state with ease of use even if he or she switches the observation state with an erroneous operation of the button, or if he or she desires to again verify already finished observation.

To implement the switching of the observation state according to the press operation performed for the observation state switching button 321 or 322, the controlling circuit 102 may be made to execute the third example of the observation state switching process the contents of which are shown in FIG. 15. However, in the process of S602 shown in FIG. 15, whether or not the press operation for the observation state switching button 321 or 322 is detected is determined instead of determining whether or not the press operation for either of the observation state switching buttons 208 on the operating unit 104 is detected.

In the screen example shown in FIG. 17, the observation state switching buttons 321 and 322 are formed by vertically partitioning the screen into two. Alternatively, the observation state switching buttons 321 and 322 may be formed by horizontally or diagonally partitioning the entire screen. For the proportion of partitioning of the screen, the observation state switching button 321 used for the instruction to switch the selection in ascending order, and the observation state switching button 322 used for the instruction to switch the selection in descending order may be implemented respectively as a large portion of the screen, and a small region at a corner of the screen.

Additionally, an observation state switching button may be formed as a large portion, such as 50 percent or more, of the screen, and button displays equivalent to the setting switching buttons 211 and the state switching button 212, which are provided on the operating unit 104, may be formed as small portions in the remaining region, instead of forming the only one observation state switching button 320 on the entire screen shown in FIG. 16, or the two observation state switching buttons 321 and 322 on the entire screen shown in FIG. 17.

Furthermore, in this implementation example, the computer 106 causes the observation state switching screens shown in FIGS. 16 and 17 to be displayed on the monitor 105. Alternatively, the operating unit 104 may be configured with an image display unit, and a touch panel arranged by being stacked on the image displaying unit, and the controlling circuit 102 may detect a touch operation that an operator performs on the touch panel in accordance with the above described observation state switching screens displayed on the image displaying unit, and may execute the process corresponding to the touch operation.

The present invention is not limited to the above described preferred embodiments, and various improvements and modifications can be made within a scope that does not depart from the gist of the present invention.

For example, the microscope main body 1 comprises the field stop 4, the aperture stop 5, the various types of cubes attached to the observation method switching unit 6, the objective lenses 9 attached to the revolving nosepiece 7, the DIC prism unit 8, the analyzer unit 13, and the like as electrically-operated optical members that are electrically inserted/extracted in/from the optical path, or opened/closed in the above described implementation examples. However, the microscope main body 1 may comprise other optical members.

What is claimed is:

1. A microscope system, comprising:
an electrically-operated unit for electrically controlling an optical member;
a detecting unit for detecting control information of the optical member on an optical path;
an instruction obtaining unit for obtaining various types of instructions;
a recording unit for collecting and recording a state of insertion/extraction or opening/closing of at least one said optical member detected by at least one said detecting unit as one observation state when the instruction obtaining unit obtains an instruction requesting recording of an observation state, wherein the recording unit records a plurality of combinations each comprising a plurality of recorded observation states;
a selecting unit for selecting one of the plurality of combinations of observation states recorded in the recording unit when the instruction obtaining unit obtains an instruction requesting selection of a combination of observation states; and
a controlling unit for controlling at least one said electrically-operated unit to switch a current observation state of the microscope system to any of the observation states included in the combination selected by the selecting unit, each time the instruction obtaining unit obtains an instruction requesting setting of a different observation state.

2. The microscope system according to claim 1, wherein:
the instruction obtaining unit includes a plurality of setting request instruction obtaining units for obtaining an instruction requesting setting of an observation state;
the recording unit records each of the observation states in each of the combinations in correspondence with a respective one of the setting request instruction obtaining units; and
the controlling unit controls at least one said electrically-operated unit to switch the current observation state to an observation state, which is included in the combination selected by the selecting unit, and which is recorded in the recording unit in correspondence with the setting request instruction obtaining unit that obtains the instruction.

3. The microscope system according to claim 1, wherein:
the instruction obtaining unit includes only one setting request instruction obtaining unit for obtaining an instruction requesting setting of a different observation state; and
the controlling unit controls at least one said electrically-operated unit to switch the current observation state to a next sequential one of the observation states included in the combination selected by the selecting unit each time the setting request instruction obtaining unit obtains an instruction requesting setting of a different observation state.

4. The microscope system according to claim 1, wherein:
the instruction obtaining unit includes two setting request instruction obtaining units for obtaining an instruction requesting setting of a different observation state;
the recording unit assigns respective order numbers to the observation states; and
the controlling unit controls at least one said electrically-operated unit to switch the current observation state to another one of the observation states included in the combination selected by the selecting unit in an ascending or descending order of the order numbers, depending on which of the two setting request instruction obtaining units obtains the instruction, each time one of the setting request instruction obtaining units obtains an instruction to request setting of different observation state.

5. The microscope system according to claim 3, wherein a single operating unit provided separately from the microscope system comprises the setting request instruction obtaining unit.

6. The microscope system according to claim 4, wherein a single operating unit provided separately from the microscope system comprises the two setting request instruction obtaining units.

7. The microscope system according to claim 1, further comprising:
a function switching unit for switching a function of an operating unit provided to obtain an instruction to request setting of an observation state among operating units comprised as instruction obtaining units.

8. A microscope system, comprising:
an electrically-operated unit for electrically controlling an optical member;
a detecting unit for detecting control information of the optical member on an optical path;
an instruction obtaining unit for obtaining various types of instructions;
a recording unit for recording an observation state comprising information detected by the detecting unit when the instruction obtaining unit obtains an instruction requesting recording of the observation state, wherein the recording unit records a plurality of observation states and assigns respective order numbers to the observation states; and
a controlling unit for controlling the electrically-operated member to switch a current observation state of the microscope system to a different observation state;

wherein the instruction obtaining unit includes two setting request instruction obtaining units for obtaining an instruction requesting setting of a different observation state; and wherein the controlling unit controls the electrically-operated unit to switch the current observation state to another one of the observation states in an ascending or descending order of the order numbers, depending on which of the two setting request instruction obtaining units obtains the instruction, each time one of the setting request instruction obtaining units obtains an instruction to request setting of a different observation state.

9. The microscope system according to claim 8, wherein a single operating unit provided separately from the microscope system comprises the two setting request instruction obtaining units.

10. The microscope system according to claim 8, further comprising:

a function switching unit for switching a function of an operating unit provided to obtain an instruction to request setting of an observation state among operating units comprised as instruction obtaining units.

\* \* \* \* \*